US009892700B2

(12) United States Patent
Yang

(10) Patent No.: US 9,892,700 B2
(45) Date of Patent: Feb. 13, 2018

(54) THIN-FILM TRANSISTOR ARRAY SUBSTRATE AND METHOD FOR DRIVING THE SAME AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventor: Kang Yang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 307 days.

(21) Appl. No.: 14/712,511

(22) Filed: May 14, 2015

(65) Prior Publication Data

US 2015/0379920 A1 Dec. 31, 2015

(30) Foreign Application Priority Data

Jun. 30, 2014 (CN) .......................... 2014 1 0304524

(51) Int. Cl.
*G06F 3/038* (2013.01)
*G09G 3/36* (2006.01)

(52) U.S. Cl.
CPC ....... *G09G 3/3648* (2013.01); *G09G 2230/00* (2013.01); *G09G 2300/0452* (2013.01); *G09G 2310/0227* (2013.01); *G09G 2320/0219* (2013.01); *G09G 2320/0242* (2013.01)

(58) Field of Classification Search
CPC .......... G09G 3/20; G09G 3/36; G09G 3/3648; G09G 2230/00; G09G 2300/0452; G09G 2310/0227; G09G 2320/0219
See application file for complete search history.

(56) References Cited

U.S. PATENT DOCUMENTS

2006/0279478 A1 12/2006 Ikegami
2007/0176859 A1 * 8/2007 Cok ..................... G09G 3/3225 345/76
2009/0160749 A1 * 6/2009 Lee ...................... G09G 3/3648 345/95

(Continued)

FOREIGN PATENT DOCUMENTS

CN 101669162 A2 3/2010

*Primary Examiner* — Kent Chang
*Assistant Examiner* — Mark Edwards
(74) *Attorney, Agent, or Firm* — Alston & Bird LLP

(57) ABSTRACT

A TFT array substrate includes gate lines, data lines insulatedly intersecting the gate lines, and pixels defined by the intersection of gate lines and data lines. The pixels comprise multiple pixel units arranged in an array, and each pixel unit comprises two first main pixels and two second main pixels. The first and second main pixels are arranged adjacently to each other in a row direction and in a column direction. Data signals are applied to odd-numbered data lines, and the voltage of even-numbered data lines from the plurality of data lines is equal to the reference potential; or the data signals are applied to the even-numbered data lines and the voltage of the odd-numbered data lines from the plurality of data lines is equal to the reference potential. The sum of rising and falling edges in one frame is less than the number of rows of the pixels.

13 Claims, 14 Drawing Sheets

(56) References Cited

U.S. PATENT DOCUMENTS

| | | | | |
|---|---|---|---|---|
| 2011/0164076 | A1* | 7/2011 | Lee | G09G 3/3406 345/691 |
| 2011/0316823 | A1* | 12/2011 | Otani | G09G 3/3688 345/204 |
| 2015/0348481 | A1* | 12/2015 | Hong | G09G 3/2003 345/690 |

* cited by examiner

THIN-FILM TRANSISTOR ARRAY SUBSTRATE AND METHOD FOR DRIVING THE SAME AND DISPLAY DEVICE

CROSS-REFERENCES TO RELATED APPLICATIONS

This application claims the benefit of priority to Chinese Patent Application No. 201410304524.X, filed with the Chinese Patent Office on Jun. 30, 2014 and entitled "THIN-FILM TRANSISTOR ARRAY SUBSTRATE AND METHOD FOR DRIVING THE SAME AND DISPLAY DEVICE", the content of which is incorporated herein by reference in its entirety.

BACKGROUND OF THE INVENTION

Technical Field

The present disclosure relates to display technologies, in particular to a Thin-Film Transistor (TFT) array substrate, a method for driving the same, and a display device.

Technical Background

With the development of display technologies, display devices are becoming more popular. When a display device is actually used and detected, there exists a color mixing phenomenon in the display device, thus requirements for display of a single-color image and a visual test of a single-color image cannot be met.

BRIEF SUMMARY OF THE INVENTION

In view this, embodiments of the present invention provide a Thin-Film Transistor array substrate, a method for driving the same and a display device to overcome the above-described problems.

Embodiments of the present invention provide a method for driving the TFT array substrate, the TFT array substrate comprising:

a plurality of gate lines;

a plurality of data lines insulatedly intersecting with the plurality of gate lines, and a plurality of pixels defined by the plurality of gate lines and the plurality of data lines;

where the plurality of pixels comprise a plurality of pixel units repeatedly arranged in an array, each of the plurality of pixel units comprises two first main pixels and two second main pixels, and in each pixel unit, the first main pixels are arranged adjacently to the respective second main pixels in a row direction and in a column direction; the plurality of data lines comprise a first set of data lines and a second set of data lines, and the first set of data lines comprise a first subset of data lines and a second subset of data lines arranged adjacently to the first subset of data lines;

wherein, the method for driving the TFT array substrate comprises:

applying data signals to the first set of data lines and maintaining a voltage of the second set of data lines at a reference potential in one frame, wherein the frame comprises at least one cycle, the at least one cycle comprises:

a first time period, during which gate driving signals are sequentially applied to M odd-numbered gate lines from the plurality of gate lines, and a voltage of the data signal applied to each of the first subset of data lines is equal to a relative potential, and a voltage of the data signal applied to each of the second subset of data lines is equal to the reference potential;

a second time period, during which the gate driving signals are sequentially applied to N even-numbered gate lines from the plurality of gate lines, the voltage of the data signal applied to each of the first subset of data lines is equal to the reference potential, and the voltage of the data signal applied to each of the second subset of data lines is equal to the relative potential; and where both M and N are positive integers, and a sum of the number of the rising edges and the number of falling edges of the data signals within one frame is less than the number of rows of the pixels.

Embodiments of the present invention provide a method for driving the TFT array substrate, the TFT array substrate comprising:

a plurality of gate lines comprising a first set of gate lines and a second set of gate lines, wherein the second set of gate lines comprise a first subset of gate lines and a second subset of gate lines;

a plurality of data lines insulatedly intersecting with the plurality of gate lines, wherein the plurality of data lines include a first set of data lines and a second set of data lines, and a plurality of pixels are defined by the plurality of gate lines and the plurality of data lines;

the plurality of pixels comprise a plurality of pixel units repeatedly arranged in an array, each of the plurality of pixel units comprises two first main pixels and two second main pixels, and in each pixel unit, the first main pixels are arranged adjacently to the respective second main pixels in a row direction and in a column direction; where the TFT array substrate further comprises a plurality of repeating units arranged in the column direction, each of the plurality of repeating units comprises two adjacent rows of pixels, and in each repeating unit, all of the first main pixels are connected to the same one from the first set of gate lines, all of the second main pixels in one of the adjacent rows are connected to the same one from the first subset of gate lines, and all of the second main pixels in the other row are connected to the same one from the second subset of gate lines;

where one frame comprises at least one cycle, each of which comprises a first time period and a second time period, and the method for driving the TFT array substrate comprises:

during the first time period, sequentially applying gate driving signals to N odd-numbered gate lines from the plurality of gate lines, wherein a voltage of the data signal applied to each of the first set of data lines is equal to a reference potential, and a voltage of the data signal applied to each of the second set of data lines is equal to a reference potential; and during the second time period, sequentially applying the gate driving signals to An even-numbered gate lines from the plurality of gate lines, wherein a voltage of the data signal applied to each of the first set of data lines is equal to the relative potential, and a voltage of the data signal applied to each of the second data lines is equal to the reference potential; or each of at least one cycle comprises a first time period and a second time period, during the first time period, sequentially applying the gate driving signals to the M odd-numbered gate lines from the plurality of gate lines, wherein the voltage of the data signal applied to each of the first set of data lines is equal to the relative potential, and the voltage of the data signal applied to each of the second set of data lines is equal to the reference potential; and during the second time period, sequentially applying the gate driving signals to the N even-numbered gate lines from the plurality of gate lines, wherein the voltage of the data signal applied to each of the first set of data lines is equal to the reference potential, and the voltage of the data signal applied to each of the second set of data lines is equal to the reference potential;

where both M and N are positive integers, and a sum of the numbers of the rising edges and falling edges of the data signals within one frame is less than the number of rows of the pixels.

Embodiments of the present invention also provide a method for driving the TFT array substrate, the TFT array substrate including:

a plurality of gate lines comprising a first set of gate lines and a second set of gate lines, wherein the second set of gate lines comprise a first subset of gate lines and a second subset of gate lines;

a plurality of data lines insulatedly intersecting with the plurality of gate lines, wherein the plurality of data lines are divided into a first set of data lines and a second set of data lines, and a plurality of pixels are defined by the plurality of gate lines and the plurality of data lines, the plurality of pixels comprise a plurality of pixel units repeatedly arranged in an array, and each of the plurality of pixel units comprises two first main pixels and two second main pixels, and in each pixel unit, the first main pixels and the second main pixels are arranged to be adjacent to the respective second main pixels in a row direction and to be adjacent to the respective second main pixels in a column direction; the TFT array substrate further comprises a plurality of repeating units arranged in the column direction, each of the plurality of repeating units comprises two adjacent rows of pixels, and in each repeating unit, all of the first main pixels are connected to the same one from the first set of gate line, all of the second main pixels in one of the adjacent rows are connected to the same one from the first subset of gate lines, and all of the second main pixels in the other row is connected to the same one from the second subset of gate lines;

in one frame, gate driving signals are sequentially are applied to each of the first set of gate lines, the voltage of each of the second set of gate lines is equal to the reference potential; the voltage of each of even-numbered data lines from the plurality of data lines is equal to the reference potential, and the data signals are applied to each of odd-numbered data lines from the plurality of data lines, the voltage of the data signals is equal to the relative potential; or the voltage of each of the odd-numbered data lines is the reference potential, and the data signals are applied to each of the even-numbered data lines, the voltage of the data signal is equal to the relative potential, wherein the sum of the numbers of the rising edges and the falling edges of the data signals is equal to the reference potential.

Accordingly, embodiments of the present invention also provide a TFT array substrate. The TFT array substrate includes:

a plurality of gate lines; comprising a first set of gate lines and a second set of gate lines, wherein the second set of gate lines comprises a first subset of gate lines and a second subset of gate lines; a plurality of data lines insulatedly intersecting with the plurality of gate lines, wherein the plurality of data lines are divided into a first set of data lines and a second set of data lines, and a plurality of pixels are defined by the plurality of gate lines and the plurality of data lines;

the plurality of pixels comprise a plurality of pixel units repeatedly arranged in an array, and each of the plurality of pixel units comprises two first main pixels and two second main pixels, and in each pixel unit, the first main pixels and the second main pixels are arranged to be adjacent to the respective second main pixels in a row direction and to be adjacent to the respective second main pixels in a column direction;

where data signals are applied to odd-numbered data lines from the plurality of data lines, and the voltage of even-numbered data lines from the plurality of data lines is equal to the reference potential; or the data signals are applied to the even-numbered data lines and the voltage of the odd-numbered data lines from the plurality of data lines is equal to the reference potential;

wherein the sum of the numbers of the rising edges and the falling edges of the data signals in one frame is less to the number of rows of the pixels.

Accordingly, embodiments of the present invention provide a display device including the TFT array substrate described above.

The technical solutions described above have a number of advantages, such as reduced power consumption in a display device.

BRIEF DESCRIPTION OF THE DRAWINGS

In order to describe the technical solutions in the embodiments of the present invention, the accompanying drawings for the description are described simply as follows. Apparently, the accompanying drawings described below are only exemplary embodiments of the present invention, and are not intended to limit the present invention. Those skilled in the art with access to the present disclosure will recognize that other embodiments can also be designed within the scope of the present invention.

DETAILED DESCRIPTION OF THE INVENTION

Figure 1A:
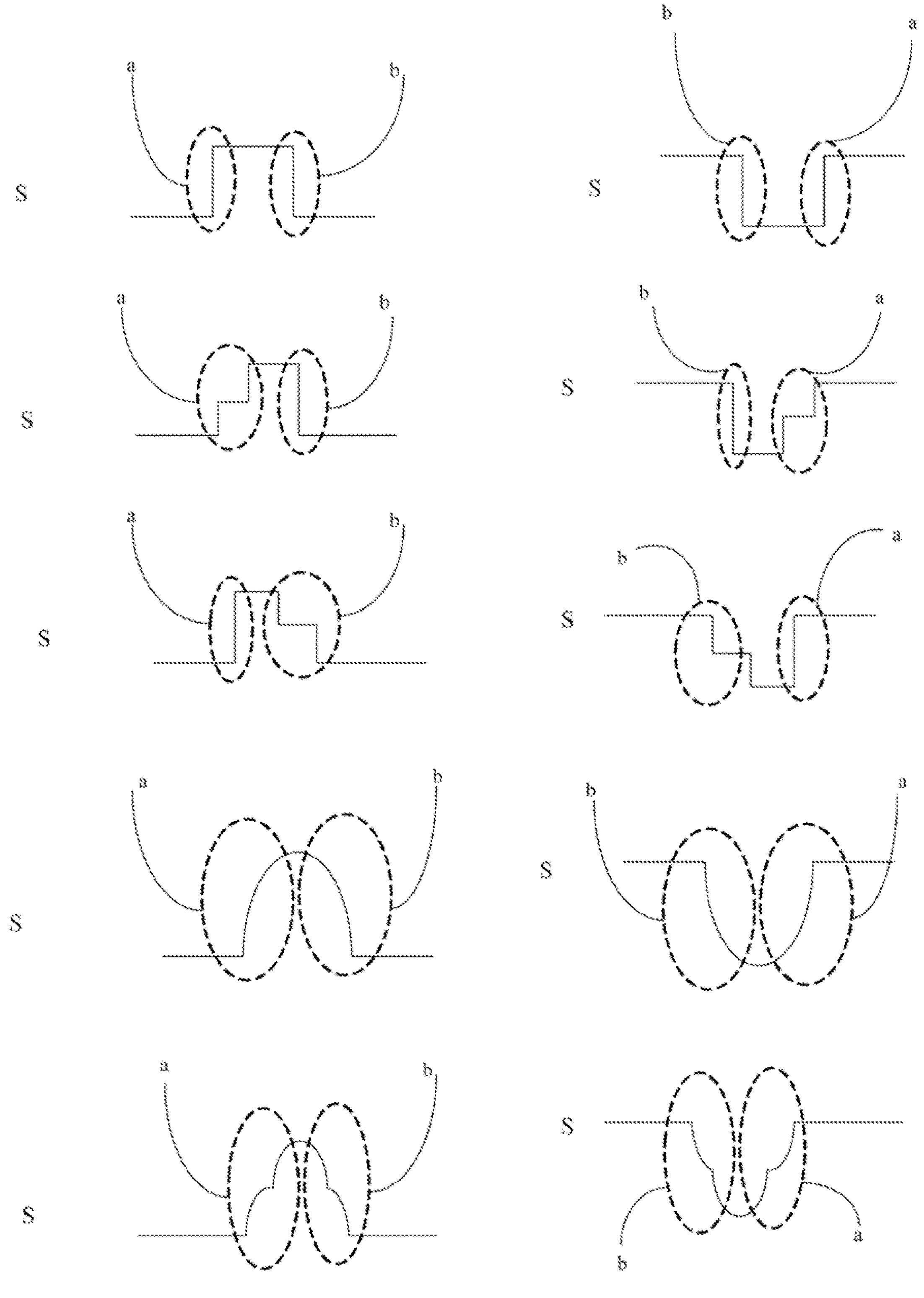
FIG. 1A shows a variety of waveforms of rising edges and falling edges of data signals S.

Technical solutions provided in embodiments of the present invention will be described in detail in combination with the accompanying drawings. It is apparent that only partial embodiments but not all embodiments of the present invention are described herein. Based on the embodiments of the present invention, other embodiments derived from the present disclosure by those skilled in the art fall within the scope of the present invention.

Many details are provided below to sufficiently describe the present invention. However, the present invention may be implemented in other manners different from those described herein, and those skilled in the art can make similar deduction on the present invention without departing from the essence of the present invention, thus the specific embodiments described below are not intended to limit the present invention.

Moreover, the present invention is described in detail in combination with the accompanying drawings. When the embodiments are illustrated in detail, the cross sectional view illustrating the structure of a device may be partially enlarged in scale, and the schematic view is exemplary and should not be considered as a limitation of the present invention. Further, three dimensional sizes including a length, a width and a depth should be included in actual fabrication.

A display device includes a TFT array substrate, and the TFT array substrate includes a plurality of pixels arranged in an array. Experiments showed that there exists a color mixing phenomenon in the TFT array substrate, which in turn leads to a color mixing phenomenon in the display device, thus the effect of the display is degraded and further the requirements for the display of a single-color image and the visual test of a single-color image cannot be satisfied.

Experiments further showed that the reason for the color mixing phenomenon existing in the TFT array substrate is that: in each frame, there are excessive changes of the polarity of a data signal applied to a data line, i.e., the sum of the number of rising edges of the data signal and the number of falling edges of the data signal is equal to the number of rows of the pixels. Generally, the TFT array substrate includes multiple rows of pixels, which means that the sum of the numbers of the rising edges and falling edges of the data signal is large, thereby causing the color mixing phenomenon in the TFT array substrate.

Experiments further showed that if the number of changes of the polarity of the data signal applied to the data line is reduced, i.e., the sum of the number of the rising edges and the number of the falling edges of the data signal is decreased to be less than the number of the rows of the pixels, the color mixing phenomenon in the TFT array substrate can be reduced or eliminated and the display effect is improved, thereby meeting the requirements for the display of a single-color image and the visual test of a single-color image.

Based on the above, experiments also showed that the changes of the polarity of the data signal applied to the data line, i.e. the sum of the numbers of the rising edges and falling edges of the data signal may be reduced by different structures of the TFT array and the corresponding driving time sequences, so that the sum of the numbers of the rising edges and falling edges of the data signal is less than the number of rows of the pixels. More details are described as follows.

Figure 1B:
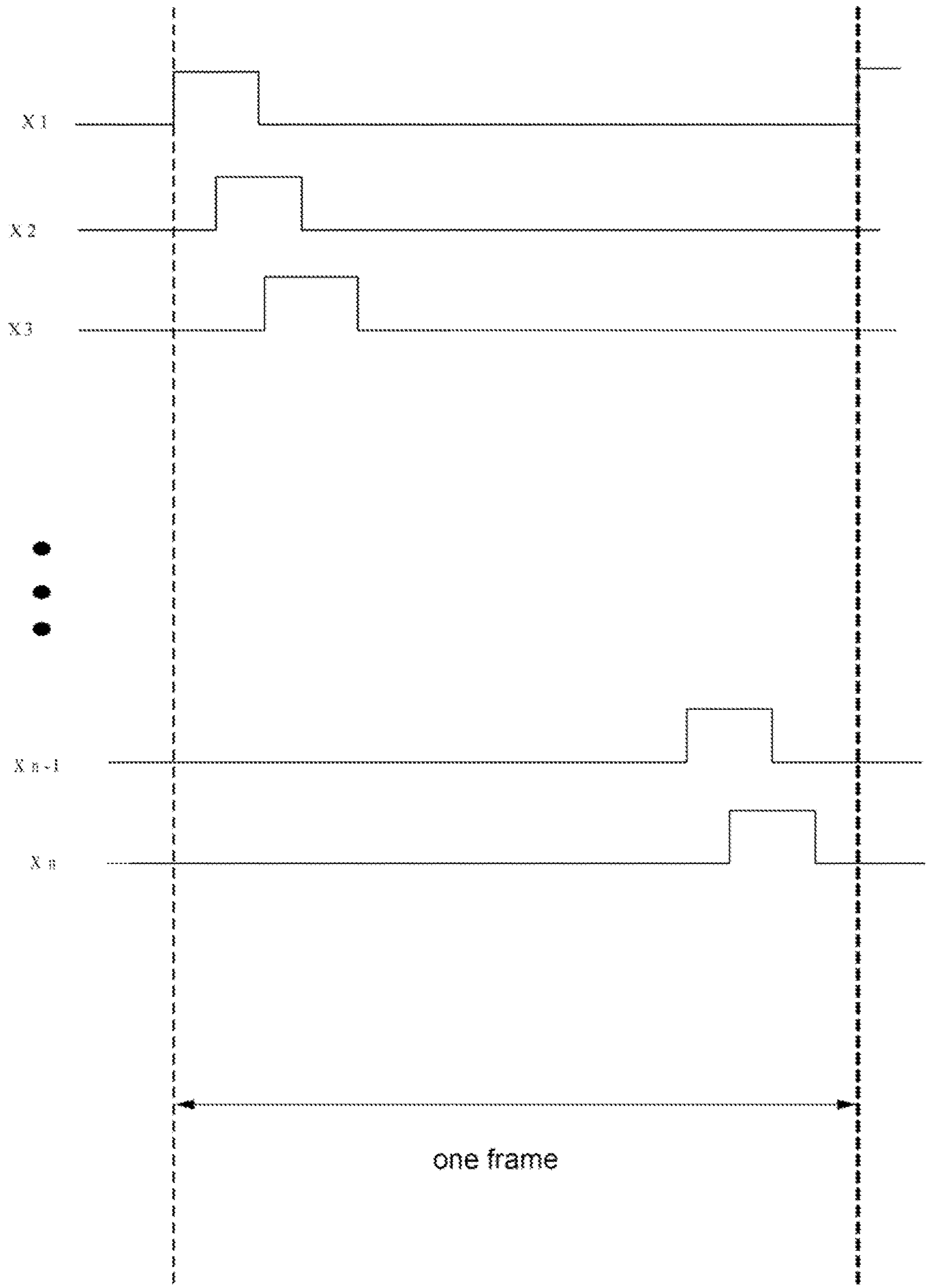
FIG. 1B is a diagram showing time sequences of sequentially applying data signals to lines X1, X2, . . . , Xn.

In the present invention, it should be noted that:

1. as for a data signal S, the term "rising edge" means that the voltage of the data signal S changes from a lower level to a higher level (for example, as indicated by a in FIG. 1A), and the term "falling edge" means that the voltage of the data signal S changes from a higher level to a lower level (for example, as indicated by b in FIG. 1A);

2. The expression of "sequentially applying data signals to lines X1, X2, . . . , Xn" can be shown as in FIG. 1B, and the present invention is not limited thereto;

3. The expression of "the voltage of a line X at a reference potential" means that the line X is not applied with a signal; in other words, the expression of "the line X is not applied with a signal Y" means that the voltage of the line X is at a reference potential;

4. generally, the reference potential is equal to zero, but the present invention is not limited thereto. Additionally, a relative potential is generally not equal to zero, but the present invention is not limited thereto, and the expression of "the voltage of the data signal applied to the line X is a relative voltage" means that the data signal is written to the line X or the data signal is applied to the line X; and 5. a plurality of pixels is defined by intersecting a plurality of data lines with a plurality of gate lines, where an "R pixel" represents a pixel configured to display in red, a "G pixel" represents a pixel configured to display in green, a "B pixel" represents a pixel configured to display in blue, and a "W pixel" represents a pixel configured to display in white. For example, in liquid crystal display devices, "a pixel configured to display in a color X" means that a color filter of a color X is located at a position on a color filter substrate that corresponds to the pixel. For example, in an organic light-emitting display device, "a pixel configured to display in a color X" refers to a color filter of a color X located at a position on a color filter substrate that corresponds to the pixel, or "a pixel configured to display in a color X" means that the pixel itself emits light of the color X.

Figure 2:
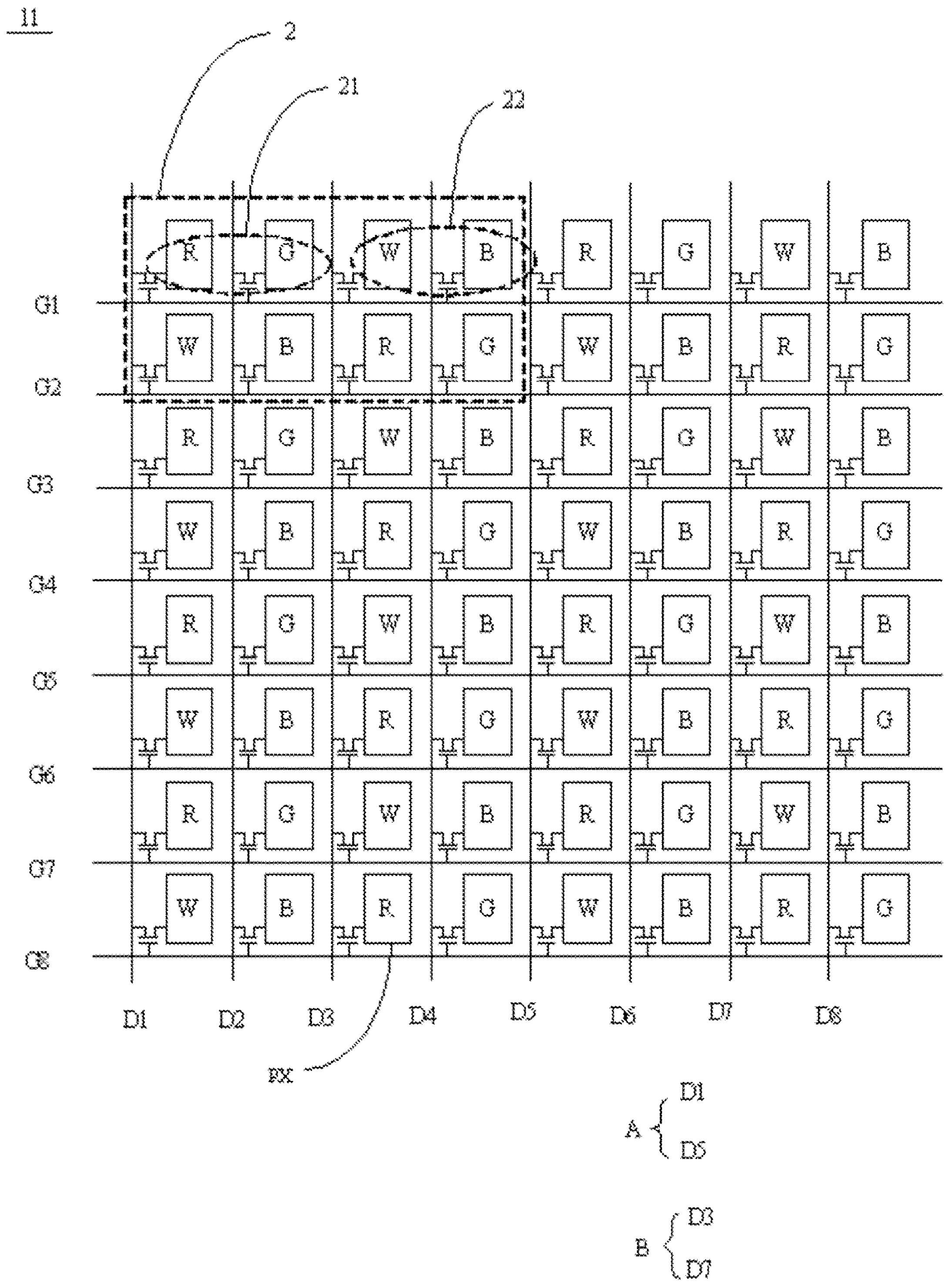
FIG. 2 is a schematic view showing the structure of a TFT array substrate in the embodiments of the present invention.

One embodiment of the present invention provides a TFT array substrate and a method for driving the same. As shown in FIG. 2, the TFT array substrate 11 includes: eight gate lines (G1, G2, . . . , G8) and eight data lines (D1, D2, . . . , D8), where each of the gate lines is insulatedly intersecting each of the data lines, and a plurality of pixels PX are defined by the gate lines and the data lines, and all pixels PX in each row are connected to the same gate line. The plurality of pixels PX form a plurality of pixel units 2 repeatedly arranged in an array, each of the plurality of pixel units 2 includes two first main pixels 21 and two second main pixels 22. In each pixel unit 2, the first main pixels 21 are arranged to be adjacent to the respective second main pixels 22 in a row direction, and to be adjacent to the respective second main pixels 22 in a column direction. The first main pixel 21 includes a first pixel and a second pixel which are arranged adjacently to each other in the row direction; and the second main pixel 22 includes a third pixel and a fourth pixel which are arranged to be adjacent to each other in the row direction. Particularly, in this embodiment, the first pixel is an R pixel, the second pixel is a G pixel, the third pixel is a W pixel, and the fourth pixel is a B pixel.

The method for driving the TFT array substrate is described as follows. The method includes:

applying data signals to a first set of data lines within a frame, and maintaining voltages of a second set of data lines at a reference potential, i.e., no data signal is applied to the second set of data lines, the frame includes at least one cycle, and each of the at least one cycle includes:

a first time period, during which gate driving signals are sequentially applied to M odd-numbered gate lines, where a voltage of the data signal applied to the first subset of data lines is equal to the relative potential which is a high level, and a voltage of the data signal applied to the second subset of data lines is equal to the reference potential; and a second time period, during which gate driving signals are sequentially applied to N even-numbered gate lines, where the voltage of the data signal applied to the first subset of data lines is equal to the reference potential, and the voltage of the data signal applied to the second subset of data lines is equal to the relative potential;

where both M and N are positive integers, and the sum of the numbers of rising edges and falling edges of the data signals within one frame is less than the number of rows of the pixels.

Figure 3:
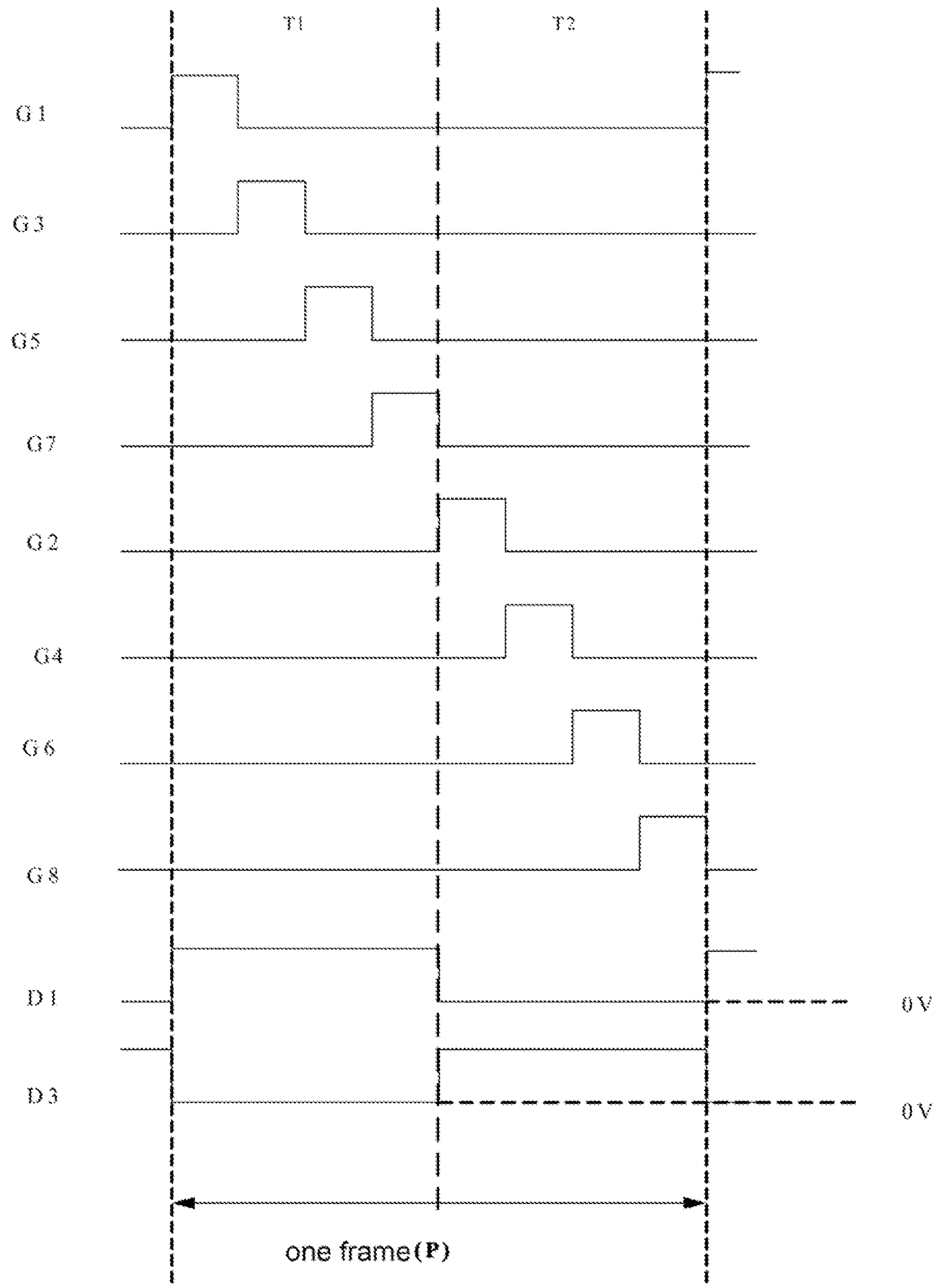
FIG. 3 is a diagram showing time sequences of signals for driving the TFT array substrate in FIG. 2.

For example, in this embodiment, a red image (i.e., a single-color image of a color R) is displayed for describing a driving method and a driving time sequence. Referring to FIGS. 2 and 3, the red image (i.e., a single-color image of a color R) is described for example, that is, the corresponding pixels used for displaying the single-color image are R pixels. In this embodiment, each of the R pixels is connected to an odd-numbered data line, thus the data signals are applied to the odd-numbered data lines, and the voltages of the even-numbered data lines are maintained at a reference potential, that is, no data signal is applied to the even-numbered data lines.

Particularly, as shown in FIGS. 2 and 3, one frame includes one cycle P, and a driving process for one frame includes: a first time period T1, during which gate driving signals are sequentially applied to the first odd-numbered gate line to the fourth odd-numbered gate line (i.e. the first gate line G1, the third gate line G3, the fifth gate line G5, and the seventh gate line G7); and a second time period T2, during which gate driving signals are sequentially applied to the first even-numbered gate line to the fourth even-numbered gate line (i.e. the second gate line G2, the fourth gate line G4, the sixth gate line G6, and the eighth gate line G8).

Further, the odd-numbered data lines include a first subset of odd-numbered data lines A and a second subset of odd-numbered data lines B which are arranged adjacently to the first subset of odd-numbered data lines A, as an embodiment, the first subset of odd-numbered data lines A can be arranged alternately with the second subset of odd-numbered data lines B. In this embodiment, the first subset of odd-numbered data lines A include the first data line D1 and the fifth data line D5, and the same data signal is applied to each of the first subset of odd-numbered data lines A (in this embodiment, since the same data signal is applied to the first data line D1 and the fifth data line D5, the waveform of the data signal applied to the first data line D1 only is shown in FIG. 3 for the purpose of convenience, and actually the waveform of the data signal applied to the fifth data line D5 is the same as that applied to the first data line D1); the second subset of odd-numbered data lines B include a third data line D3 and a seventh data line D7, and the same data signal is applied to each of the second subset of odd-numbered data lines B (in this embodiment, since the same data signal is applied to the third data line D3 and the seventh data line D7, the waveform of the data signal applied to the third data line D3 only is shown in FIG. 3 for the purpose of convenience, and actually the waveform of the data signal applied to the seventh data line D7 is the same as that applied to the third data line D3).

As shown in FIGS. 2 and 3, the red image (i.e., a single-color image of a color R) is displayed for example, that is, the corresponding pixels for displaying the single-color image are R pixels. However, in this embodiment, each of the R pixels is connected to an odd-numbered data line, and therefore the data signals are applied to the odd-numbered data lines in this embodiment, and the voltages of the even-numbered data lines are maintained at the reference potential, that is, no data signal is applied to the even-numbered data lines.

Figure 3A:
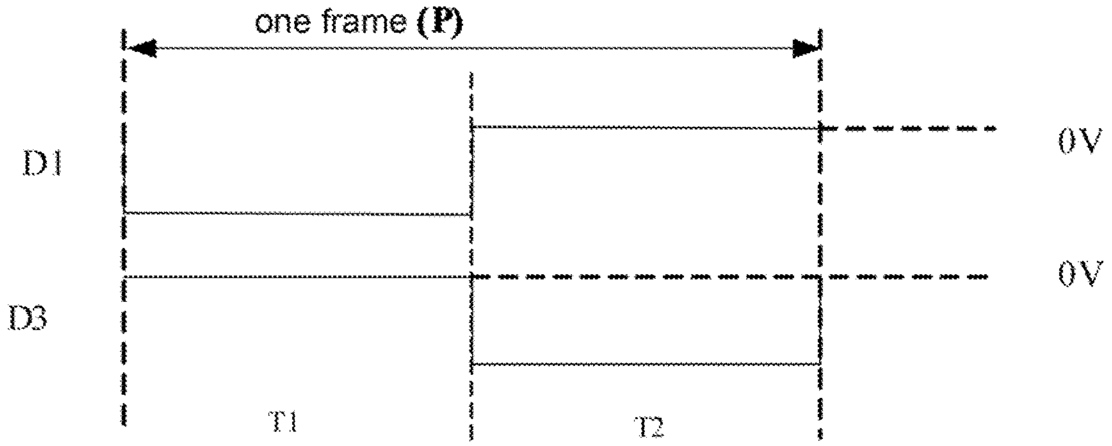
FIG. 3A shows waveforms of variants of signals applied to a first subset of odd-numbered data lines and a second subset of odd-numbered data lines in FIG. 3.

During the first time period T1, the gate driving signals are sequentially applied to the odd-numbered gate lines (i.e. the first gate line G1, the third gate line G3, the fifth gate line G5, and the seventh gate line G7), where the voltage of the data signal applied to the first subset of odd-numbered data lines A is equal to the relative potential, and the voltage of the data signal applied to the second subset of odd-numbered data lines B is equal to the reference potential; that is, each of the voltages of the data signals applied to the first data line D1 and the fifth data line D5 is equal to the relative potential (where the waveform of the data signal applied to each of the first data line D1 and the fifth data line D5 may be the same as the waveform of the data signal applied to the first data line D1 shown in FIG. 3 or FIG. 3A), and the data signal applied to the first data line D1 is the same as the data signal applied to the fifth data line D5; and each of the voltages of the data signals applied to the third data line D3 and the seventh data line D7 is equal to the reference potential.

During the second time period T2, the gate driving signals are sequentially applied to the even-numbered gate lines (i.e. the second gate line G2, the fourth gate line G4, the sixth gate line G6, and the eighth gate line G8), where the voltage of the data signal applied to the second subset of odd-numbered data lines B is equal to the relative potential, and the voltage of the data signal applied to the first subset of odd-numbered data lines A is equal to the reference potential; that is, each of the voltages of the data signals applied to the third data line D3 and the seventh data line D7 is equal to the relative potential (where the waveform of the data signal applied to each of the third data line D3 and the seventh data line D7 may be the same as the waveform of the data signal applied to the third data line D3 shown in FIG. 3 or FIG. 3A), and the data signal applied to the third data line D3 is the same as the data signal applied to the seventh data line D7; and each of the voltages of the data signals applied to the first data line D1 and the fifth data line D5 is equal to the reference potential.

In this embodiment, the sum of the numbers of rising edges and falling edges of the data signals within one frame satisfies the following relation:

$$X/2=Y/2N \qquad (1)$$

where Y/2N represents the number of cycles in one frame, X represents the sum of the number of rising edges and the number of falling edges of the data signals in one frame; Y represent the number of rows of the pixels, and both N and Y are positive integers, and N is less than or equal to Y/2. Particularly, in this embodiment, the number P of the cycles is equal to 1, the sum of the numbers of the rising edges and falling edges of each of the data signals is equal to 2, and the number of rows of the pixels is equal to 8, thus N=Y/2=4, i.e., the sum of the number of the rising edges and the number of falling edges of the data signals in one frame is less than the number of rows of the pixels.

It should be noted in this embodiment that:

1. The number of the gate lines, the number of the data lines, the number of the pixels, the number of rows of the pixels and the number of columns of the pixels in the TFT array substrate are exemplary and not limited, as long as actually the TFT array substrate includes a plurality of gate lines, a plurality of data lines, a plurality of pixels arranged in an array, a plurality of rows of pixels and a plurality of columns of pixels. The number of the gate lines, the number of the data lines, the number of the pixels, the number of the rows of the pixels and the number of the columns of the pixels are not limited in any way in this embodiment.

2. In the example the first pixel is an R pixel, the second pixel is a G pixel, the third pixel is a W pixel, and the fourth pixel is a B pixel, but the present invention is not limited thereto. In another actual application, the first pixel can be the R pixel, the second pixel can be the G pixel, the third pixel can be the B pixel, and the fourth pixel can be the W pixel; or the first pixel can be the G pixel, the second pixel can be the R pixel, the third pixel can be the W pixel, and the fourth pixel can be the B pixel; or the first pixel can be the G pixel, the second pixel can be the R pixel, the third pixel can be the B pixel, and the fourth pixel can be the W pixel; or the first pixel can be the W pixel, the second pixel can be the B pixel, the third pixel can be the R pixel, and the fourth pixel can be the G pixel; or the first pixel can be the B pixel, the second pixel can be the W pixel, the third pixel can be the R pixel, and the fourth pixel can be the G pixel; or the first pixel can be the W pixel, the second pixel can be the B pixel, the third pixel can be the G pixel, and the fourth pixel can be the R pixel; or the first pixel can be the B pixel, the second pixel can be the W pixel, the third pixel can be the G pixel, and the fourth pixel can be the R pixel; but this embodiment is not limited thereto.

3. The test for a red image is merely taken as an example, which is exemplary and is not intended to limit the present invention. Since the principle for displaying the red image is the same as those for displaying a green image, a blue image and a white image, displaying the red image (i.e., a single-color image of a color R) is taken as an example to illustrate the driving method and the driving time sequence in this embodiment, but the present embodiment is not limited thereto. As shown in FIGS. 2 and 3, the red image (i.e., a single-color image of a color R) is displayed as an example, that is, the corresponding pixels for displaying the red image are R pixels, and each of the R pixels is connected to an odd-numbered data line in this embodiment. Therefore, the data signals are applied to the odd-numbered data lines in this embodiment, and the voltage of the even-numbered data lines is maintained at the reference potential, that is, no data signal is applied to the even-numbered data lines. In other words, whether the data voltages are applied to the odd-numbered gate lines or to the even-numbered data lines depends on the data lines to which the corresponding pixels for displaying the single-color image are connected. If the single-color image is displayed by the corresponding pixels connected to the odd-numbered data lines, then the data signals are applied to the odd-numbered data lines, and the voltage of the even-numbered data lines is maintained at the reference potential, i.e., no data signal is applied to the even-numbered data lines; if the single-color image is displayed by the corresponding pixels connected to the even-numbered data lines, then the data signals are applied to the even-numbered data lines, and the voltage of the odd-numbered data lines is maintained at the reference potential, i.e., no data signal is applied to the odd-numbered data lines.

When the data signals are applied to the even-numbered data lines and no data signal is applied to the odd-numbered data lines (i.e., the voltage of the odd-numbered data lines is maintained at the reference potential), the even-numbered data lines include first subset of even-numbered data lines and second subset of even-numbered data lines arranged adjacently to the first subset of even-numbered data lines, as an embodiment, the first subset of even-numbered data lines can be arranged alternately with second subset of even-numbered data lines, and during the first time period T1, the gate driving signals are sequentially applied to odd-numbered gate lines, the voltage of the data signal applied to the first subset of even-numbered data lines is equal to the relative potential, and the voltage of the data signal applied to the second subset of even-numbered data lines is equal to the reference potential; and during the second time period T2, the gate driving signals are sequentially applied to even-numbered gate lines, the voltage of the data signal applied to the first subset of even-numbered data lines is equal to the reference potential, and the voltage of the data signal applied to the second subset of even-numbered data lines is equal to the relative potential.

In other words, if the first set of data lines are the odd-numbered data lines, the second set of data lines are the even-numbered data lines, the first subset of data lines are the first subset of odd-numbered data lines, and the second subset of data lines are the second subset of odd-numbered data lines, then the method for driving the TFT array substrate includes:

in each frame, applying the data signals to the odd-numbered data lines, and the voltage of the even-numbered data lines is maintained at the reference potential, i.e., no data signal is applied to the even-numbered data lines, where one frame includes at least one cycle, each of which includes:

a first time period, during which the gate driving signals are sequentially applied to M odd-numbered gate lines, the voltage of the data signal applied to the first subset of odd-numbered data lines is equal to the relative potential, and the voltage of the data signal applied to the second subset of odd-numbered data lines is equal to the reference potential; and a second time period, during which the gate driving signals are sequentially applied to N even-numbered gate lines, the voltage of the data signal applied to the first subset of odd-numbered data lines is equal to the reference potential, and the voltage of the data signal applied to the second subset of odd-numbered data lines is equal to the relative potential; or if the first set of data lines are the even-numbered data lines which include a first subset of even-numbered data lines and a second subset of even-numbered data lines, the second set of data lines are the odd-numbered data lines, the first subset of data lines are the first subset of even-numbered data lines and the second subset of data lines are the second subset of even-numbered data lines, then the method for driving the TFT array substrate includes:

in each frame, applying the data signals to the even-numbered data lines, and the voltage of the odd-numbered data lines is maintained at the reference potential, i.e. no data signal is applied to the odd-numbered data lines, where one frame includes at least one cycle, each of which includes:

a first time period, during which the gate driving signals are sequentially applied to M odd-numbered gate lines, the voltage of the data signal applied to the first subset of even-numbered data lines is equal to the relative potential, and the voltage of the data signal applied to the second subset of even-numbered data lines is equal to the reference potential, and a second time period, during which the gate driving signals are sequentially applied to N even-numbered gate lines, the voltage of the data signal applied to the first subset of even-numbered data lines is equal to the reference potential, and the voltage of the data signal applied to the second subset of even-numbered data lines is equal to the relative potential.

4. In this embodiment, the frame includes for example one cycle, which is exemplary and the present invention is not limited thereto, as long as actually one frame includes at least one cycle, and the driving method of each of the at least one cycle includes:

sequentially applying the gate driving signals to M odd-numbered gate lines during the first time period T1; and sequentially applying the gate driving signals to N even-numbered gate lines during the second time period T2; where, the sum of the numbers of the rising edges and falling edges of the data signals satisfies the relation:

$$X/2=Y/2N \qquad (1)$$

where Y/2N represents the number of the cycles in one frame, X represents the sum of the number of rising edges and the number of falling edges of the data signals in one frame; Y represents the number of rows of the pixels, and both N and Y are positive integers, and N is less than or equal to Y/2.

The embodiments of the present invention provide the TFT array substrate and the method for driving the same. With the combination of the TFT array substrate with the corresponding method for driving the TFT array substrate, the sum of the numbers of the rising edges and the falling edges of the corresponding data signals in one frame is less than the number of rows of the pixels, to relieve or even-numbered eliminate the color mixing phenomenon in the TFT array substrate and improve the display effect, thereby meeting the requirements for the display of a single-color image and the visual test of a single-color image. Further, the embodiments of the present invention can also be applied to the display driving of a module assembly, and the changes of the polarity of the data signals in displaying the single-color image are reduced, thereby reducing the power consumption for driving the displaying of a single-color image by the module assembly, i.e. reducing the power consumption of the display device.

Another embodiment of the present invention is further provided, a TFT array substrate in the present embodiment is the same as that in the above embodiment, and the same portion would not be described again herein. A difference between the above embodiment and the present embodiment lies in that a method for driving the TFT array substrate in the present embodiment is different from that in the above embodiment. More specific details are described as follows.

Figure 4:
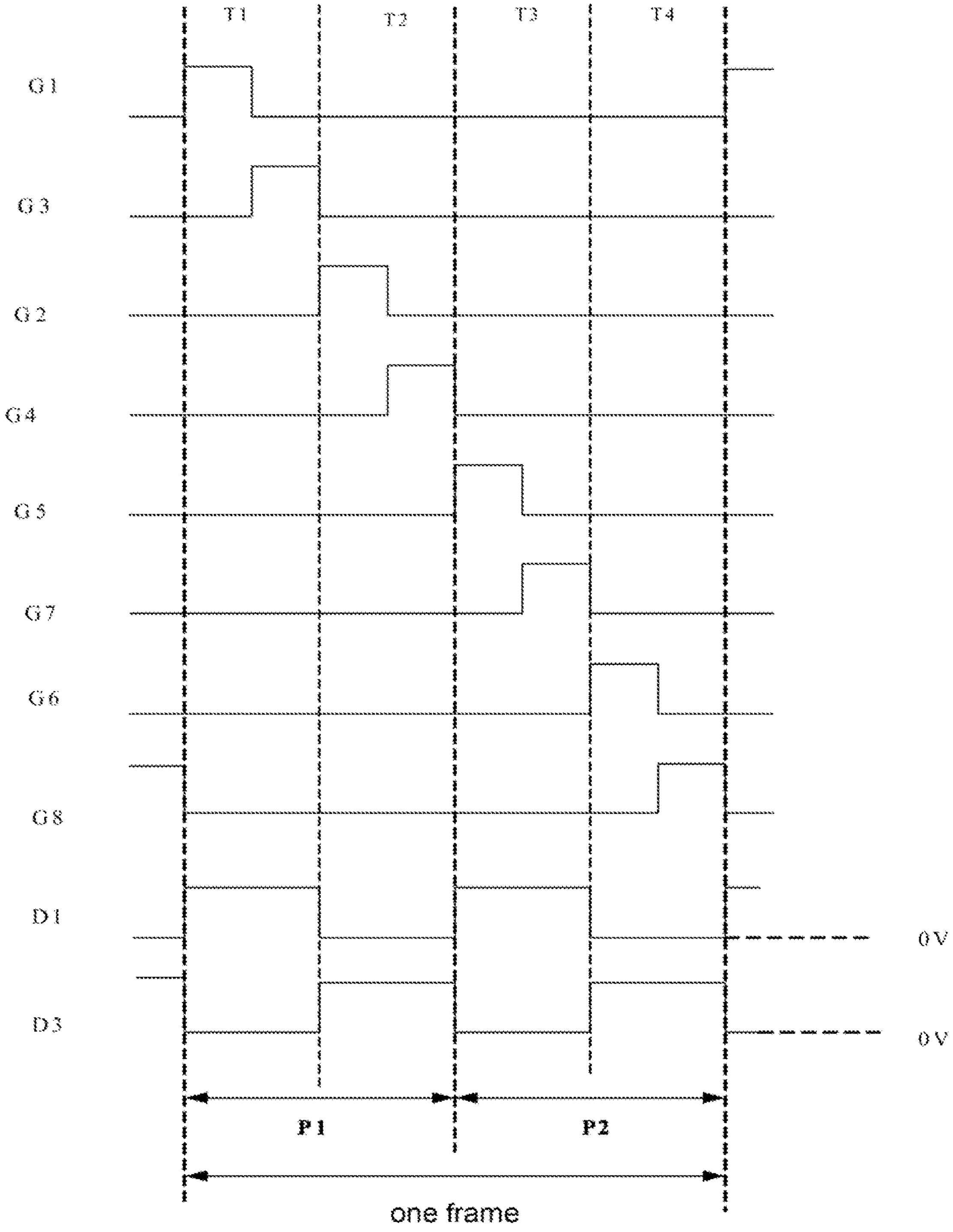
FIG. 4 is a diagram showing time sequences of variants of the signals for driving the TFT array substrate in FIG. 2 according to an embodiment of the present invention.

As shown in FIGS. 2 and 4, in this embodiment, since the same data signal is applied to the first data line D1 and the fifth data line D5, the waveform of the data signal applied to the first data line D1 only is shown in FIG. 4 for the purpose of convenience. Actually, the waveform of the data signal applied to the fifth data line D5 is the same as that applied to the first data line D1; since the same data signal is applied to the third data line D3 and the seventh data line D7, the waveform of the data signal applied to the third data line D3 only is shown in FIG. 4 for the purpose of convenience. Actually, the waveform of the data signal applied to the seventh data line D7 is the same as that applied to the third data line D3.

As shown in FIGS. 2 and 4, in the present embodiment, one frame includes two cycles, the sum of the numbers of the rising edges and the falling edges of the data signals is equal to 4. Particularly, a driving process for one frame includes: a first cycle P1 and a second cycle P2, and N=Y/4=2, where the first cycle P1 includes a first time period T1 and a second time period T2.

Figure 4A:
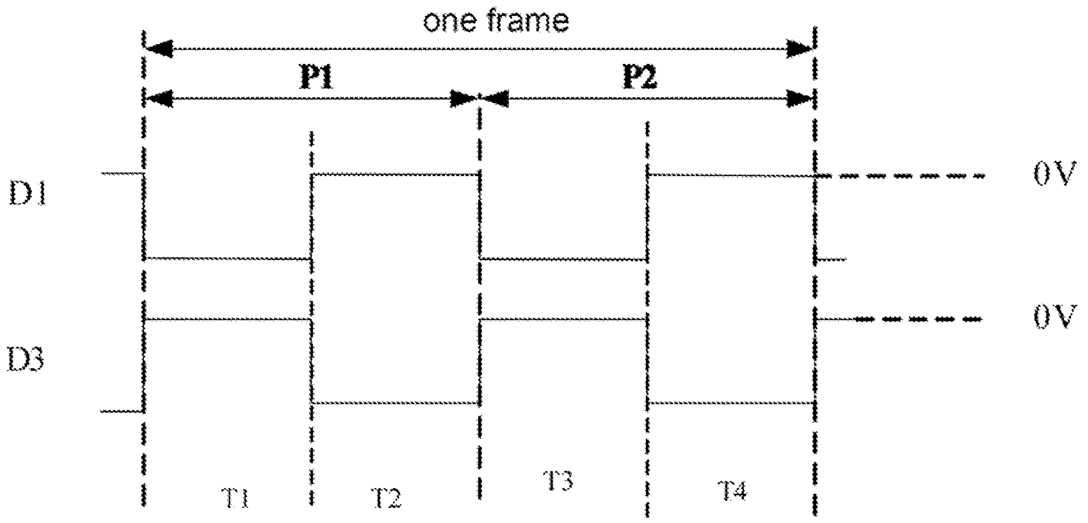
FIG. 4A shows waveforms of variants of signals applied to a first subset of odd-numbered data lines and a second subset of odd-numbered data lines in FIG. 4.

During the first time period T1, gate driving signals are sequentially applied to the first subset of odd-numbered gate line and the second subset of odd-numbered gate line (i.e., the first gate line G1 and the third gate line G3); where, the voltage of the data signal applied to the first subset of odd-numbered data lines A is equal to a relative potential, and the voltage of the data signal applied to the second subset of odd-numbered data lines B is equal to a reference potential; that is, each of the voltages of the data signals applied to the first data line D1 and the fifth data line D5 is equal to the relative potential (where the waveform of the data signal applied to each of the first data line D1 and the fifth data line D5 may be the same as the waveform of the data signal applied to the first data line D1 shown in FIG. 4 or FIG. 4A), and the data signal applied to the first data line D1 is the same as the data signal applied to the fifth data line D5; and each of the voltages of the data signals applied to the third data line D3 and the seventh data line D7 is equal to the reference potential.

During the second time period T2, the gate driving signals are sequentially applied to the first even-numbered gate line and the second even-numbered gate line (i.e., the second gate line G2 and the fourth gate line G4); where the voltage of the data signal applied to the second subset of odd-numbered data lines B is equal to the relative potential, and the voltage of the data signal applied to the first subset of odd-numbered data lines A is equal to the reference potential; that is, each of the voltages of the data signals applied to the third data line D3 and the seventh data line D7 is equal to the relative potential (where the waveform of the data signal applied to each of the third data line D3 and the seventh data line D7 may be the same as the waveform of the data signal applied to the third data line D3 shown in FIG. 4 or FIG. 4A), and the data signal applied to the third data line D3 is the same as the data signal applied to the seventh data line D7; and each of the voltages of the data signals applied to the first data line D1 and the fifth data line D5 is equal to the reference potential.

The second cycle P2 includes a third time period T3 and a fourth time period T4.

During the third time period T3, the gate driving signals are sequentially applied to the third odd-numbered gate line to the fourth odd-numbered gate line (i.e., the fifth gate line G5 and the seventh gate line G7), where the voltage of the data signal applied to the first subset of odd-numbered data lines A is equal to the relative potential, and the voltage of the data signal applied to the second subset of odd-numbered data lines B is equal to the reference potential; that is, the same data signal having a voltage equal to the relative potential is applied to the first data line D1 and the fifth data line D5 (where the waveform of the data signal applied to the first data line D1 and the fifth data line D5 may be the waveform of the data signal applied to the first data line D1 shown in FIG. 4 or FIG. 4A); and each of the voltages of the data signals applied to the third data line D3 and the seventh data line D7 is equal to the reference potential.

During the fourth time period T4, the gate driving signals are sequentially applied to the third even-numbered gate line to the fourth even-numbered gate line (i.e., the sixth gate line G6 and the eighth gate line G8), where the voltage of the data signal applied to the second subset of odd-numbered data lines B is equal to the relative potential, and the voltage of the data signal applied to the first subset of odd-numbered data lines A is equal to the reference potential; that is, each of the voltages of the data signals applied to the third data line D3 and the seventh data line D7 is equal to the relative potential (where the waveform of the data signal applied to each of the third data line D3 and the seventh data line D7 may be the same as the waveform of the data signal applied to the third data line D3 shown in FIG. 4 or FIG. 4A), and the data signal applied to the third data line D3 is the same as the data signal applied to the seventh data line D7; and each of the voltages of the data signals applied to the first data line D1 and the fifth data line D5 is equal to the reference potential.

Figure 5:
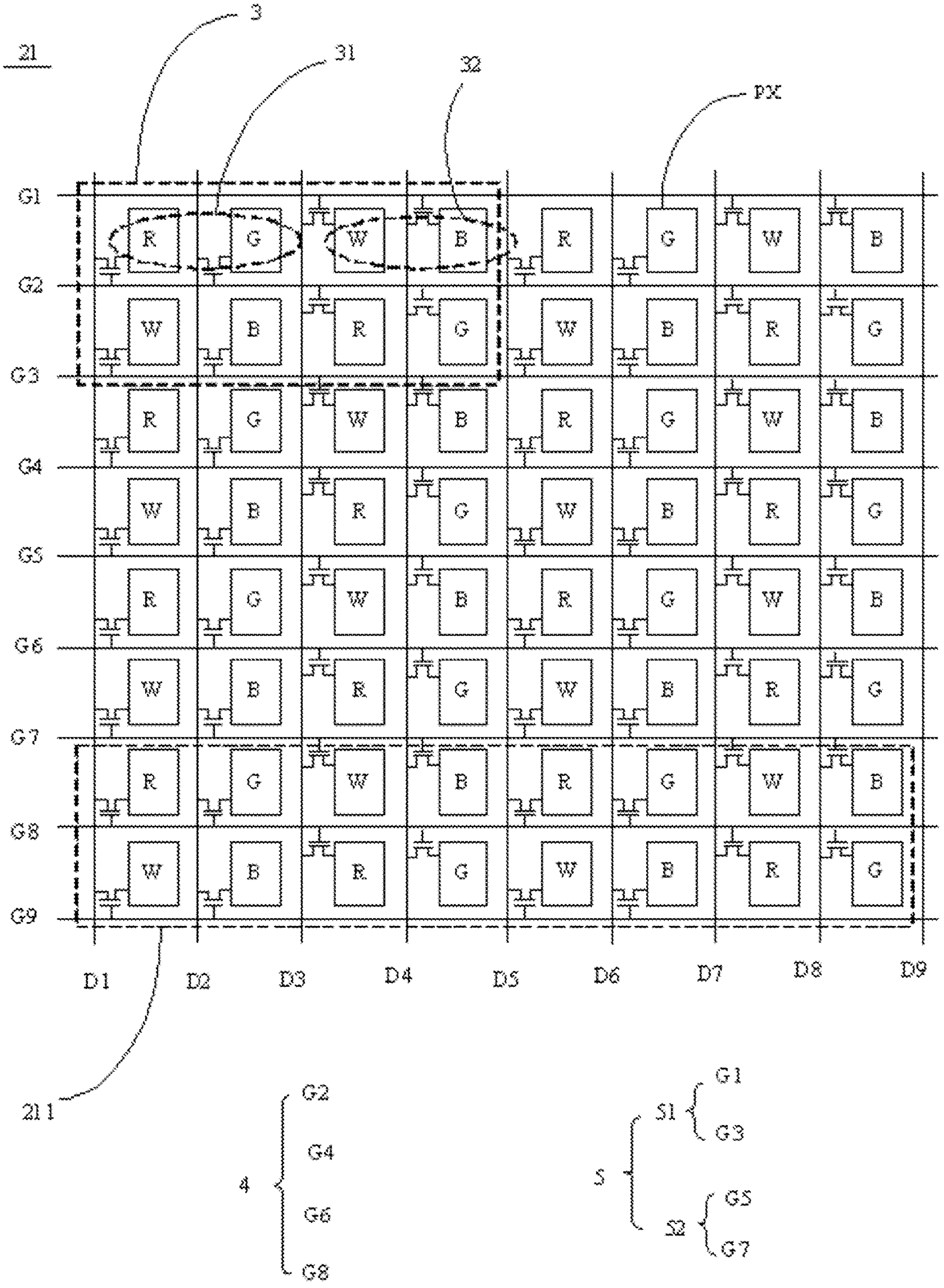
FIG. 5 is a schematic view showing the structure of another TFT array substrate in the embodiments of the present invention.

Another embodiment of the present invention is further disclosed to provide a TFT array substrate and a method for driving the same. As shown in FIG. 5, the TFT array substrate 21 includes: nine gate lines G1, G2, . . . , G8, G9, and nine data lines D1, D2, . . . , D9 each of which insulatedly intersects with each of the gate lines, and a plurality of pixels PX are defined by the gate lines and the data lines. The plurality of pixels PX form a plurality of pixel units 3 repeatedly arranged in an array, each of the plurality of pixel units 3 includes two first main pixels 31 and two second main pixels 32. In each pixel unit 3, the first main pixels 31 are arranged to be adjacent to the respective second main pixel 32 in a row direction, and to be adjacent to the respective second main pixel 32 in a column direction. The first main pixel 31 includes a first pixel and a second pixel which are arranged to be adjacent to each other in the row direction; and the second main pixel 32 includes a third pixel and a fourth pixel which are arranged to be adjacent to each other in the row direction. Particularly, in this embodiment, the first pixel is an R pixel, the second pixel is a G pixel, the third pixel is a W pixel, and the fourth pixel is a B pixel.

The TFT array substrate 21 further includes a plurality of repeating units 211 arranged in the column direction, and each of the plurality of repeating units 211 includes two adjacent rows of the pixels.

The gate lines include a first set of gate lines 4 and a second set of gate lines 5, and the second set of gate lines 5 include a first subset of gate lines 51 and a second subset of gate lines 52. In each repeating unit 211, all the first main pixels 31 are connected to the same gate line from the first set of gate lines 4, all second main pixels 32 in one of the two adjacent rows of pixels within the repeating unit 211 are connected to one from the first subset of gate lines 51 among the second set of gate lines 5, and all second main pixels 32 in the other of the two adjacent rows of pixels within the repeating unit 211 are connected to one from the second subset of gate lines 52 among the second set of gate lines 5.

Here, the first set of gate lines 4 include even-numbered gate lines, and the second set of gate lines 5 include odd-numbered gate lines; or the first set of gate lines 4 include odd-numbered gate lines, and the second set of gate lines 5 include even-numbered gate lines. Particularly, the red image (i.e. a single-color image of a color R) is displayed as an example in this embodiment, that is, the corresponding pixels for displaying the single-color image are the R pixels, further in this embodiment, each of the R pixels is connected to an odd-numbered data line and an even-numbered gate line. Therefore, the first set of gate lines 4 include the even-numbered gate lines.

A method for driving the TFT array substrate is described below.

One frame includes at least one cycle, each of which includes:

a first time period, during which gate driving signals are sequentially applied to M odd-numbered gate lines, and a voltage of the data signal applied to each of the first subset of data lines is equal to a reference potential, and a voltage of the data signal applied to each of the second subset of data lines is equal to a reference potential; and a second time period, during which gate driving signals are sequentially applied to N even-numbered gate lines, a voltage of the data signal applied to each of the first subset of data lines is equal to the relative potential, and a voltage of the data signal applied to each of the second subset of data lines is equal to the reference potential; or each of the at least one cycle includes:

a first time period, during which gate driving signals are sequentially applied to M odd-numbered gate lines, the voltage of the data signal applied to each of the first subset of data lines is equal to the relative potential, and the voltage of the data signal applied to each of the second subset of data lines is equal to the reference potential; and a second time period, during which gate driving signal to are sequentially applied to N even-numbered gate lines, the voltage of the data signal applied to each of the first subset of data lines is equal to the reference potential, and the voltage of the data signal applied to each of the second subset of data lines is equal to the reference potential.

For example, displaying a red image (i.e., a single-color image of a color R) is given as an example to illustrate the driving method and the driving time sequence in this embodiment. In this embodiment, the sum of the numbers of the rising edges and falling edges of the data signals within one frame satisfies the relation:

$$X/2=Y/2N \qquad (1)$$

where Y/2N represents the number of cycles in one frame, X represents the sum of the number of rising edges and the number of falling edges of the data signals within one frame; Y represent the number of rows of the pixels, M, N and Y are positive integers, and N is less than or equal to Y/2. Particularly, in this embodiment, as shown in FIGS. 5 and 6, there is one cycle P (i.e. one frame includes one cycle P), the sum of the numbers of the rising edges and falling edges of each of the data signals is equal to 2, and there are 8 rows of the pixels, thus N=Y/2=4, i.e., the sum of the numbers of the rising edges and falling edges of the data signals in one frame is less than the number of rows of the pixels.

Figure 6:
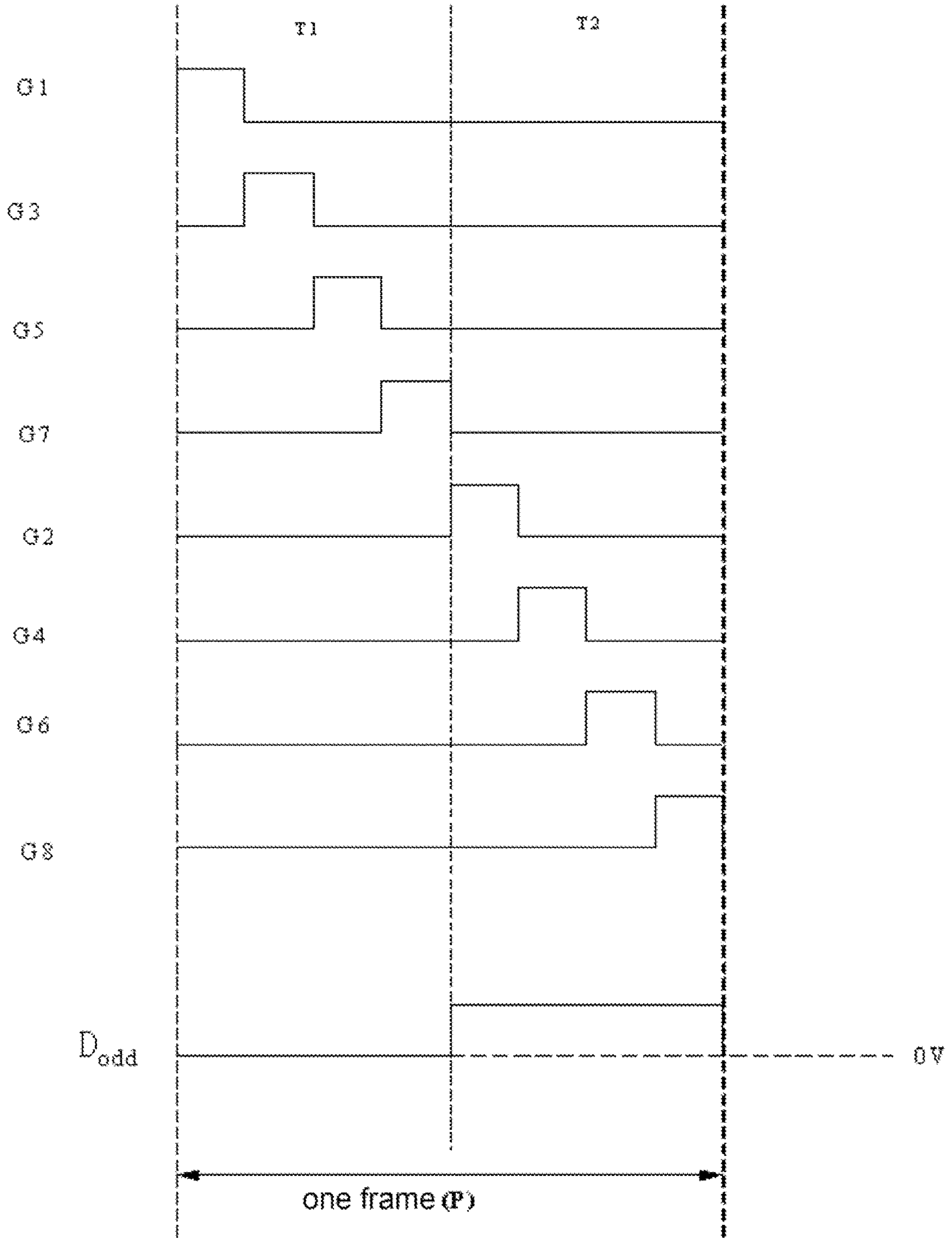
FIG. 6 is a diagram showing time sequences of signals for driving the TFT array substrate in FIG. 5 according to an embodiment of the present invention.
Figure 6A:
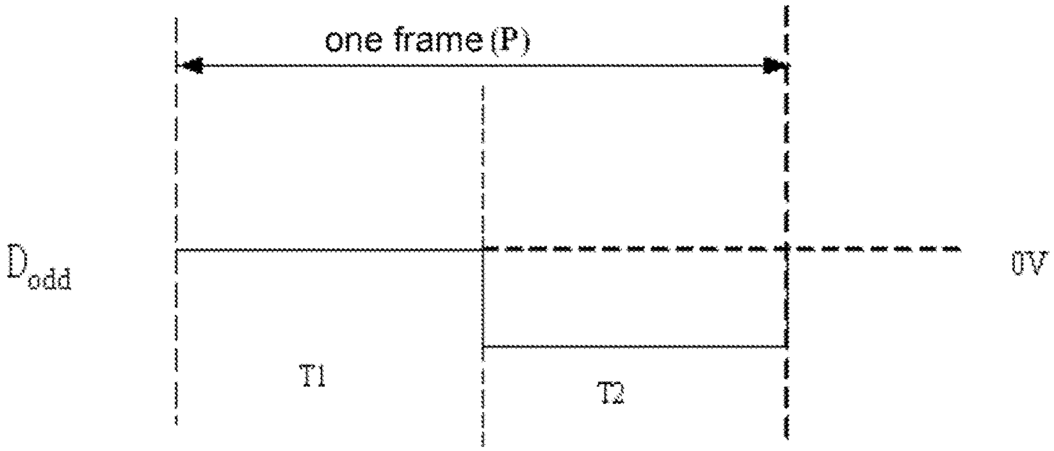
FIG. 6A shows a waveform of a variant of the signal applied to odd-numbered data lines in FIG. 6.

In this embodiment, as shown in FIGS. 5 and 6, the red image (i.e. a single-color image of a color R) is displayed as an example, that is, the corresponding pixels for displaying the single-color image are the R pixels, further in this embodiment, each of the R pixels is connected to an odd-numbered data line and an even-numbered gate line. Therefore in the present embodiment, the first set of gate lines 4 are even-numbered gate lines, the data signals are applied to the odd-numbered data lines, and the voltage of the data signal applied to the even-numbered data lines is equal to the reference potential, i.e. no data signal is applied to the even-numbered data lines, then a driving process for one cycle (i.e., one frame) includes:

during the first time period T1, sequentially applying the gate driving signals to four gate lines from the second set of gate lines 5 (i.e., the first gate line G1, the third gate line G3, the fifth gate line G5, and the seventh gate line G7), where the voltage of the data signal applied to each of the odd-numbered data lines $D_{odd}$ is equal to the reference potential; and during the second time period T2, sequentially applying the gate driving signals to four gate lines from the first set of gate lines 4 (i.e. the second gate line G2, the fourth gate line G4, the sixth gate line G6, and the eighth gate line G8), where the voltage of the data signal applied to each of the odd-numbered data lines $D_{odd}$ is equal to the relative potential;

where the same data signals are respectively applied to the odd-numbered data lines $D_{odd}$, and the data signal applied to a data line $D_{odd}$ as shown in FIG. 6 or FIG. 6A may be employed as the data signal applied to each of the odd-numbered data lines $D_{odd}$.

In other embodiments, the first set of gate lines can be odd-numbered gate lines, then the driving process for one frame includes:

during the first time period T1, sequentially applying the gate driving signals to four gate lines from the first set of gate lines (i.e. the odd-numbered gate lines), where the voltage of the data signal applied to each of the odd-numbered data lines is equal to the relative potential; and during the second time period T2, sequentially applying the gate driving signals to four gate lines from the second set of gate lines (i.e. the even-numbered gate lines), where the voltage of the data signal applied to each of the odd-numbered data lines is equal to the reference potential.

It should be noted in this embodiment that:

1. The first set of gate lines are designed in such a way that all first main pixels in each repeating unit are connected to the same one from the first set of gate lines; in other words, in each repeating unit, all pixels configured for displaying the same color are connected to the same gate line, which acts as one of the first set of gate lines.

2. The number of the gate lines, the number of the data lines, the number of the pixels, the number of rows of the pixels and the number of columns of the pixels in the TFT array substrate are exemplary and not limited, as long as actually the TFT array substrate includes a plurality of gate lines, a plurality of data lines, a plurality of pixels arranged in an array, a plurality of rows of pixels and a plurality of columns of pixels. The number of the gate lines, the number of the data lines, the number of the pixels, the number of the rows of the pixels and the number of the columns of the pixels are not limited in any way in this embodiment.

3. In the example the first pixel is an R pixel, the second pixel is a G pixel, the third pixel is a W pixel, and the fourth pixel is a B pixel, but the present invention is not limited thereto. In another actual application, the first pixel can be the R pixel, the second pixel can be the G pixel, the third pixel can be the B pixel, and the fourth pixel can be the W pixel; or the first pixel can be the G pixel, the second pixel can be the R pixel, the third pixel can be the W pixel, and the fourth pixel can be the B pixel; or the first pixel can be the G pixel, the second pixel can be the R pixel, the third pixel can be the B pixel, and the fourth pixel can be the W pixel; or the first pixel can be the W pixel, the second pixel can be the B pixel, the third pixel can be the R pixel, and the fourth pixel can be the G pixel; or the first pixel can be the B pixel, the second pixel can be the W pixel, the third pixel can be the R pixel, and the fourth pixel can be the G pixel; or the first pixel can be the W pixel, the second pixel can be the B pixel, the third pixel can be the G pixel, and the fourth pixel can be the R pixel; or the first pixel can be the B pixel, the second pixel can be the W pixel, the third pixel can be the G pixel, and the fourth pixel can be the R pixel; but this embodiment is not limited thereto.

4. The test for a red image is merely taken as an example, which is exemplary and is not intended to limit the present invention. Since the principle for displaying the red image is the same as those for displaying a green image, for displaying a blue image and for displaying a white image, displaying the red image (i.e. a single-color image of a color R) is taken as an example to illustrate the driving method and the driving time sequence in this embodiment, but the present embodiment is not limited thereto. As shown in FIGS. 5 and 6, the red image (i.e. a single-color image of a color R) is displayed as an example, that is, the corresponding pixels for displaying the red image are R pixels, and each of the R pixels is connected to an odd-numbered data line in this embodiment. Therefore, the data signals are applied to the odd-numbered data lines in this embodiment, and the voltage of the even-numbered data lines is maintained at the reference potential, that is, no data signal is applied to the even-numbered data lines.

In other words, whether the data voltages are applied to the odd-numbered gate lines or to the even-numbered data lines depends on the data lines to which the corresponding pixels for displaying the single-color image are connected. If the single-color image is displayed by the corresponding pixels connected to the odd-numbered data lines, then the data signals are applied to the odd-numbered data lines, and the voltage of the even-numbered data lines is maintained at the reference potential, i.e. no data signal is applied to the even-numbered data lines; if the single-color image is displayed by the corresponding pixels connected to the even-numbered data lines, then the data signals are applied to the even-numbered data lines, and the voltage of the odd-numbered data lines is maintained at the reference potential, i.e., no data signal is applied to the odd-numbered data lines.

When the data signals are applied to the even-numbered data lines but not to the odd-numbered data lines, and the gate driving signals are applied to the first set of gate lines 4, the voltage of the data signal applied to each of the even-numbered data lines is equal to the relative potential; or when the data signals are applied to the even-numbered data lines but not to the odd-numbered data lines (i.e., the voltages of the odd-numbered data lines are maintained at the reference potential), and the gate driving signals are applied to the second set of gate lines 5, the voltage of the data signal applied to each of the even-numbered data lines is equal to the reference potential.

In other words, as long as that the first set of gate lines are the even-numbered gate lines from the plurality of gate lines, the second set of gate lines are odd-numbered gate lines, the first set of data lines are odd-numbered data lines from the plurality of data lines, and each of the at least one cycle includes:

the first time period, during which the gate driving signals are sequentially applied to M gate lines from the second set of gate lines, wherein the voltage of the data signal applied to each of the odd-numbered data lines from the plurality of data lines is equal to the reference potential, and the voltage of each of the even-numbered data lines from the plurality of data lines is equal to the reference potential, that is, no data signal is applied to each of the even-numbered data lines from the plurality of data lines;

during the second time period, during which the gate driving signals are sequentially applied to N gate lines from the first set of gate lines, wherein the voltage of the data signal applied to each of the odd-numbered data lines from the plurality of data lines is equal to the relative potential, and the voltage of each of the even-numbered data lines from the plurality of data lines is equal to the reference potential, that is, no data signal is applied to each of the even-numbered data lines from the plurality of data lines; or the first set of gate lines are the even-numbered gate lines from the plurality of gate lines, the second set of gate lines are odd-numbered gate lines, the first set of data lines are even-numbered data lines from the plurality of data lines, and each of at least one cycle includes:

the first time period, during which the gate driving signals are sequentially applied to the M gate lines from the second set of gate lines, wherein the voltage of the data signal applied to each of the even-numbered data lines from the plurality of data lines is equal to the reference potential, and the voltage of each of the odd-numbered data lines from the plurality of data lines is equal to the reference potential, that is, no data signal is applied to each of the odd-numbered data lines from the plurality of data lines;

the second time period, during which the gate driving signals are sequentially applied to the N gate lines from the first set of gate lines, wherein the voltage of the data signal applied to each of the even-numbered data lines from the plurality of data lines is equal to the relative potential, and the voltage of each of the odd-numbered data lines from the plurality of data lines is equal to the reference potential, that is, no data signal is applied to each of the odd-numbered data lines from the plurality of data lines; or the first set of gate lines are the odd-numbered gate lines from the plurality of gate lines, the second set of gate lines are the even-numbered gate line, the first set of data lines are the odd-numbered data lines from the plurality of data lines, and each of the at least one cycle includes:

the first time period, during which the gate driving signals are sequentially applied to the M first gate lines from the first set of gate lines, wherein the voltage of the data signal applied to each of the odd-numbered data lines from the plurality of data lines is equal to the relative potential, and the voltage of each of the even-numbered data lines from the plurality of data lines is equal to the reference potential, that is, no data signal is applied to each of the oven data lines from the plurality of data lines;

the second time period, during which the gate driving signals are sequentially applied to the N gate lines from the second set of gate lines, wherein the voltage of the data signal applied to each of the odd-numbered data lines from the plurality of data lines is equal to the reference potential, and the voltage of each of the even-numbered data lines from the plurality of data lines is equal to the reference potential, that is, no data signal is applied to each of the oven data lines from the plurality of data lines; or the first set of gate lines are the odd-numbered gate lines from the plurality of gate lines, the second set of gate lines are the even-numbered gate lines, the first set of data lines are the even-numbered data lines from the plurality of data lines, and each of the at least one cycle includes:

the first time period, during which the gate driving signals are sequentially applied to the M first gate lines from the first set of gate lines, wherein the voltage of the data signal applied to each of the even-numbered data lines from the plurality of data lines is equal to the relative potential, and the voltage of each of the odd-numbered data lines from the plurality of data lines is equal to the reference potential, that is, no data signal is applied to each of the odd-numbered data lines from the plurality of data lines;

the second time period, during which the gate driving signals are sequentially applied to the N gate lines from the second set of gate lines, wherein the voltage of the data signal applied to each of the even-numbered data lines from the plurality of data lines is equal to the reference potential, and the voltage of each of the odd-numbered data lines from the plurality of data lines is equal to the reference potential, that is, no data driving signal is applied to each of the odd-numbered data lines from the plurality of data lines.

5. In this embodiment, the frame includes for example one cycle, the R pixel is to be tested, the first set of gate lines are oven gate lines, which are exemplary and the present invention is not limited thereto, as long as actually one frame includes at least one cycle, and the driving method of each of the at least one cycle includes:

when the first set of gate lines are odd-numbered gate lines, the driving method of each of the at least one cycle includes:

sequentially applying the gate driving signals to M first set of gate lines during the first time period T1; and sequentially applying the gate driving signals to N second set of gate lines during the second time period T2;

when the first set of gate lines are even-numbered gate lines, the driving method of each of the at least one cycle includes:

sequentially applying the gate driving signals to M second set of gate lines during the first time period T1; and sequentially applying the gate driving signals to N first set of gate lines during the second time period T2;

the sum of the numbers of the rising edges and falling edges of the data signals satisfies the relation:

$$X/2=Y/2N \quad (1)$$

where Y/2N represents the number of the cycles in one frame, X represents the sum of the number of rising edges and the number of falling edges of the data signals in one frame; Y represents the number of rows of the pixels, and both N and Y are positive integers, and N is less than or equal to Y/2.

The embodiments of the present invention provide the TFT array substrate and the method for driving the same. With the combination of the TFT array substrate with the corresponding method for driving the TFT array substrate, the sum of the numbers of the rising edges and the falling edges of the corresponding data signals in one frame is less than the number of rows of the pixels, to relieve or even-numbered eliminate the color mixing phenomenon in the TFT array substrate and improve the display effect, thereby meeting the requirements for the display of a single-color image and the visual test of a single-color image. Further, the embodiments of the present invention can also be applied to the display driving of a module assembly, and the changes of the polarity of the data signals in displaying the single-color image are reduced, thereby reducing the power consumption for driving the displaying of a single-color image by the module assembly, i.e. reducing the power consumption of the display device.

Figure 7:
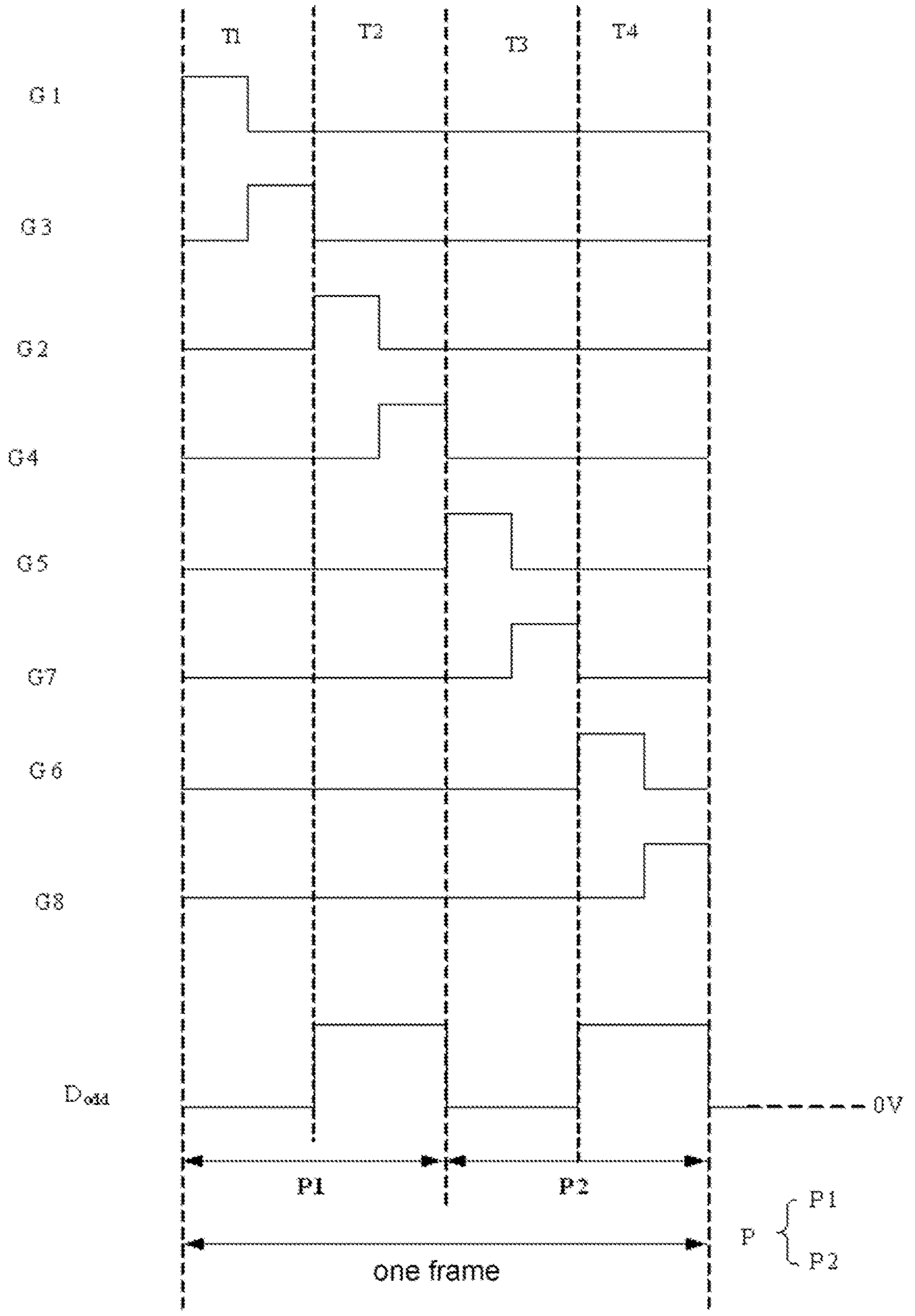
FIG. 7 is a diagram showing time sequences of variants of the signals for driving the TFT array substrate in FIG. 5.
Figure 7A:
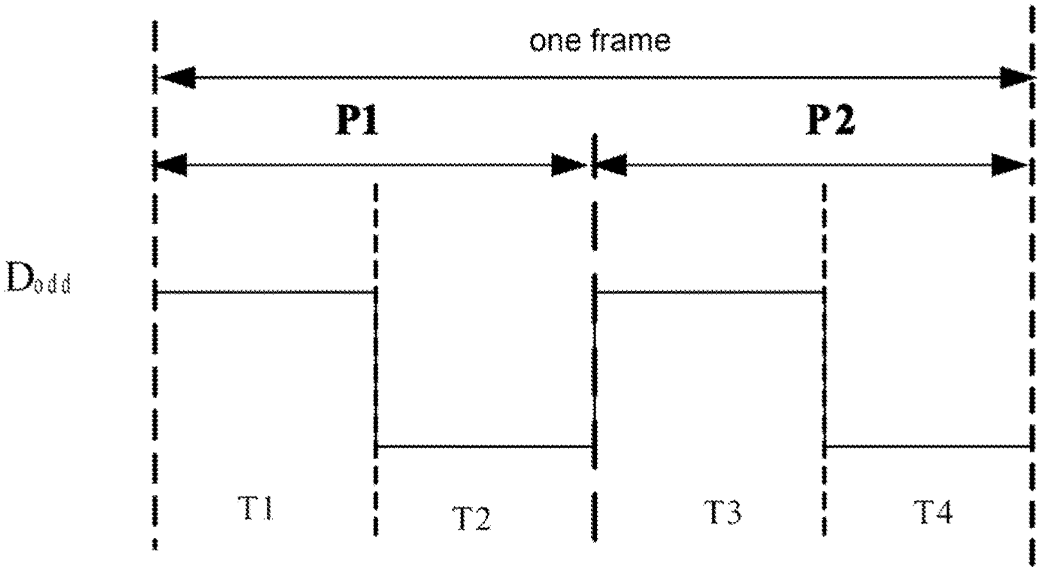
FIG. 7A shows a waveform of a variant of the signal applied to odd-numbered data lines in FIG. 7.

Another embodiment of the present invention is further provided, as shown in FIGS. 5 and 7, a TFT array substrate described in the present embodiment is the same as that in another embodiment, and the same portion would not be described again herein, A difference between the present embodiment and another embodiment lies in that a method for driving the TFT array substrate in the present embodiment is different from that in another embodiment. More specific details are described as follows:

one frame includes two cycles P, the sum of the numbers of the rising edges and the falling edges of the data line is equal to 4. In this embodiment, N=Y/4=2, the first set of gate lines are the even-numbered gate lines from the plurality of gate lines, a driving process for one frame includes:

the first cycle P1 includes a first time period T1 and a second time period T2:

during the first time period T1, gate driving signals are sequentially applied to the first gate line to the second gate line from the second set of gate lines 5 (i.e., first gate line G1 and the third gate line G3), where the voltage of the data signal applied to each of the odd-numbered data lines $D_{odd}$ is equal to the reference potential;

during the second time period T2, the gate driving signals are sequentially applied to the first gate line to the second gate line from the first set of gate lines 4 (i.e., the second gate line G2 and the fourth gate line G4), where the voltage of the data signal applied to each of the odd-numbered data lines $D_{odd}$ is equal to the relative potential;

and the second cycle P2 includes a third time period T3 and a fourth time period T4, during the third time period T3, the gate driving signals are sequentially applied to the third gate line to the fourth gate line from the second set of gate lines 5 (i.e., the fifth gate line G5 and the seventh gate line G7), where the voltage of the data signal applied to each of the odd-numbered data lines $D_{odd}$ is equal to the reference potential;

during the fourth time period T4, the gate driving signals are sequentially applied to the third gate line to the fourth gate line from the first set of gate lines 4 (i.e., the sixth gate line G6 and the eighth gate line G8), where the voltage of the data signal applied to each of the odd-numbered data lines $D_{odd}$ is equal to the relative potential.

where the data signal applied to each of the odd-numbered data lines $D_{odd}$ is same and the data signal applied to the $D_{odd}$ may be the same $D_{odd}$ shown in FIG. 7 or in FIG. 7A.

In another embodiment, the first set of gate lines may be the odd-numbered gate lines, then the driving process for one frame includes:

the first cycle includes a first time period T1 and a second time period T2.

During the first time period T1, gate driving signals are sequentially applied to the first gate line to the M-th gate line from the first set of gate lines, where the voltage of the data signals applied to each of the odd-numbered data lines is equal to the relative potential;

during the second time period T2, gate driving signals are sequentially applied to the first gate line to the N-th gate line from the second set of gate lines, where the voltage of the data signal applied to each of the odd-numbered data lines is equal to the reference potential;

and the second cycle includes a third time period T3 and a fourth time period T4:

during the third time period T3, the gate driving signals are sequentially applied to the (M+1)-th gate line to the (Y/2)-th gate line from the first set of gate lines, where the voltage of the data signal applied to each of the odd-numbered data lines is equal to the relative potential;

during the second time period T4, sequentially the gate driving signals are applied to the (N+1)-th gate line to the (Y/2)-th gate line from the second set of gate lines, where the voltage of the data signal applied to each of the odd-numbered data lines is equal to the reference potential.

Figure 8:
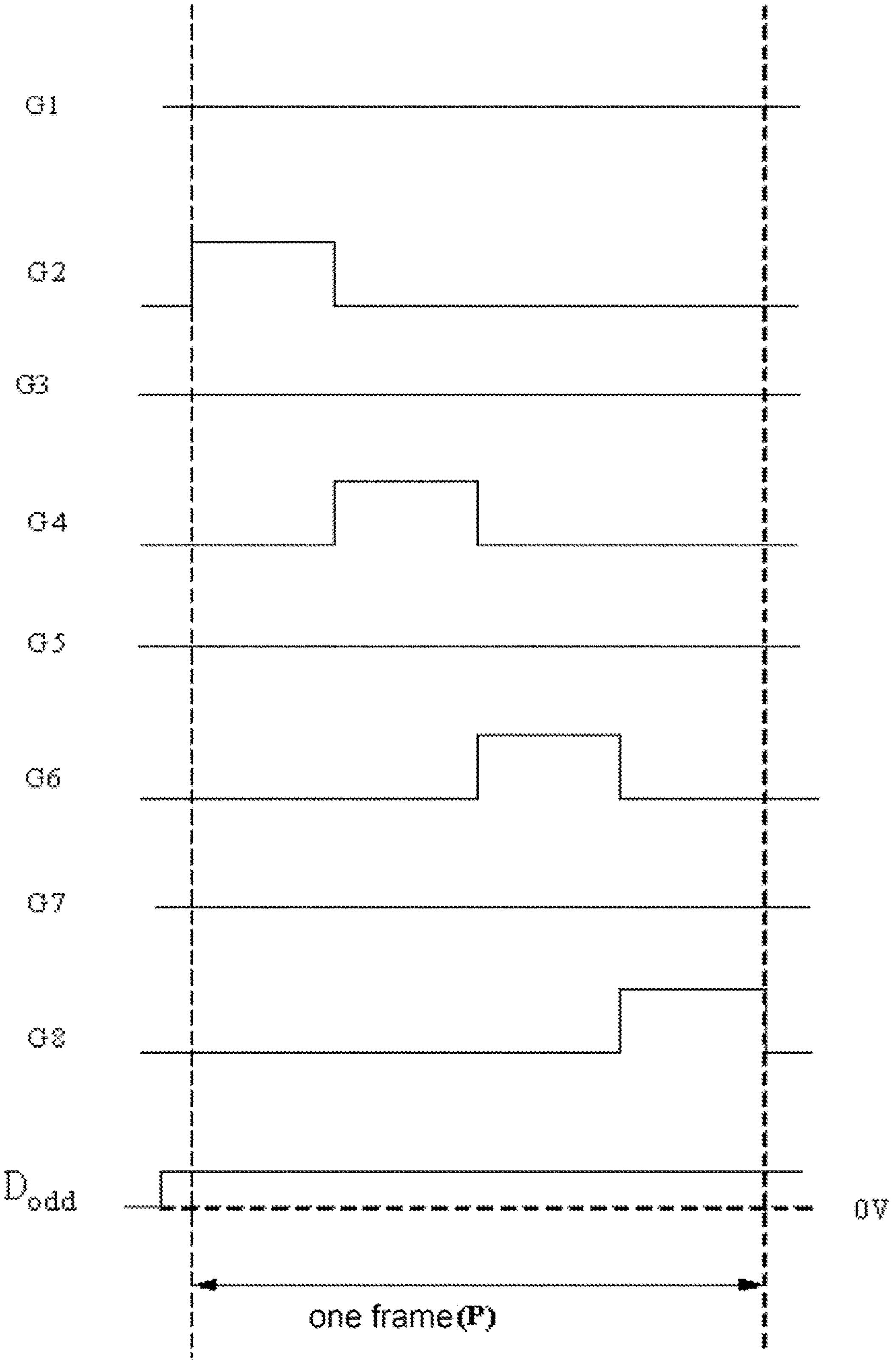
FIG. 8 is a diagram showing time sequences of variants of the signals for driving the TFT array substrate in FIG. 5.
Figure 8A:
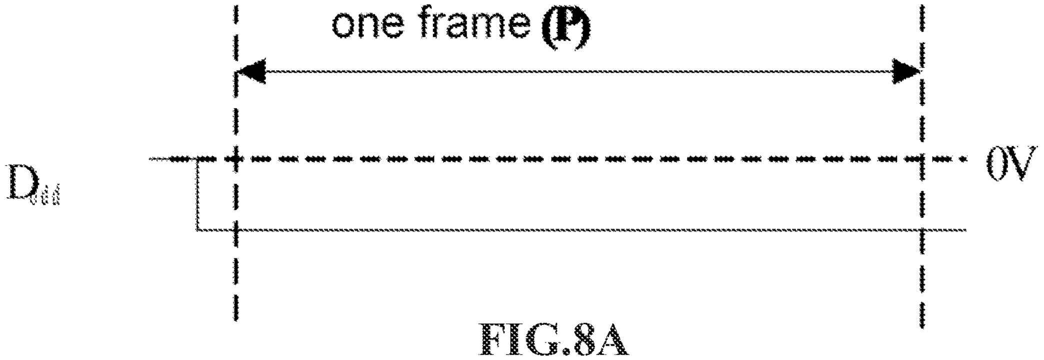
FIG. 8A shows a waveform of a variant of the signal applied to odd-numbered data lines in FIG. 8.

Another embodiment of the present invention is further provided, a TFT array substrate described in the present embodiment is the same as that in another embodiment, and the same portion would not be described again herein, A difference between the present embodiment and another embodiment lies in that a method for driving the TFT array substrate in the present embodiment is different from that in another embodiment. More specific details are described as follows:

As shown in FIGS. 5 and 8, in one frame, gate driving signals are sequentially applied to each of the first gate lines 4 (i.e. the second gate line G2, the fourth gate line G4, the sixth gate line G6, the eighth gate line G8), the voltage of the data signal applied to the each of the even-numbered data lines is equal to the reference potential, i.e. no data signal is applied to the even-numbered data lines; the data signal $D_{odd}$ is applied to each of the odd-numbered data lines, where the sum of the rising edges and falling edges of the data signal $D_{odd}$ is equal to the reference potential, and the voltage of the data signal $D_{odd}$ is equal to the relative potential; the voltage of the second set of gate lines 5 is equal to the reference potential (i.e. no gate driving signal is applied to the first gate line G1, the third gate line G3, the fifth gate line G5, the seventh gate line G7);

It should be noted that the test for the R pixel is merely taken as an example in this embodiment, thus the first set of gate lines are defined as the even-numbered gate lines, and this embodiment illustrates the method for driving the TFT array substrate, which is exemplary and is not intended to limit the present invention. In other embodiments, if the test for the B pixel is taken as an example, the first set of gate lines are odd-numbered gate lines and the second set of gate lines are even-numbered gate lines, then the gate driving signals are sequentially applied to each of the first set of gate lines in one frame, and the voltage of each of the odd-numbered data lines is equal to the reference potential, i.e. no data signal is applied to the odd-numbered data lines; the data signals are applied to each of the even-numbered data lines, and the sum of the rising edges and falling edges of the data signal is equal to the reference potential, and the voltage of the data signals is equal to the relative potential; the voltage of the second set of gate lines is equal to the reference potential, i.e. no data signal is applied to the second set of gate lines 5.

Embodiments of the present invention provide the TFT array substrate, the method for driving the same and the display device. With the combination of the TFT array substrate with the corresponding method for driving the same, the sum of the numbers of the rising edges and the falling edges of the corresponding data signals in one frame is less than the number of rows of the pixels, to relieve or even-numbered eliminate the color mixing phenomenon in the TFT array substrate and improve the display effect, thereby meeting the requirements for the display of a single-color image and the visual test of a single-color image.

As an embodiment, in this embodiment, the sum of the numbers of the rising edges and the falling edges of the corresponding data signals is equal to the reference potential, which can eliminate the color mixing phenomenon displayed in the display device and improve the display effect, thereby meeting the requirement for the display of a single-color image and the visual test of a single-color image.

Further, the embodiments of the present invention can also be applied to the display driving of a module assembly, and the changes of the polarity of the data signals in displaying the single-color image are reduced, thereby reducing the power consumption for driving the displaying of a single-color image by the module assembly, i.e. reducing the power consumption of the display device.

Figure 9:
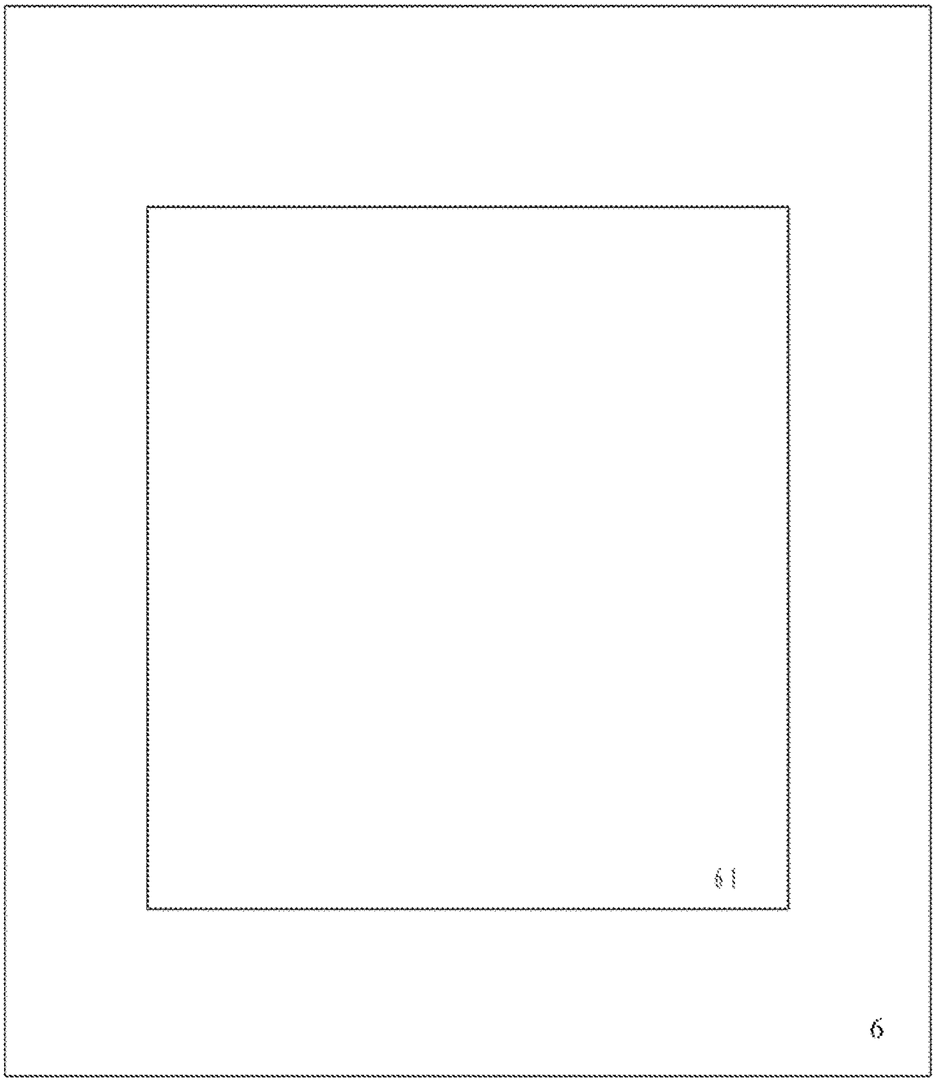
FIG. 9 is a schematic view showing the structure of a display device according to an embodiment of the present invention.

As shown in FIG. 9, a display device 6 including a TFT array substrate 61 is provided in the present invention, and the TFT array substrate 61 is the one in any one of the embodiments described above, where the display device includes a liquid crystal display device or an organic light-emitting display device, which is exemplary and is not intended to limit thereto.

As can be seen from the above, the embodiments of the present invention provide the TFT array substrate, the method for driving the same and the display device. With the combination of the TFT array substrate with the corresponding method for driving the TFT array substrate, the sum of the numbers of the rising edges and the falling edges of the corresponding data signals in one frame is less than the number of rows of the pixels, to relieve or even-numbered eliminate the color mixing phenomenon in the TFT array substrate and improve the display effect, thereby meeting the requirements for the display of a single-color image and the visual test of a single-color image. Further, the embodiments of the present invention can also be applied to the display driving of a module assembly, and the changes of the polarity of the data signals in displaying the single-color image are reduced, thereby reducing the power consumption for driving the displaying of a single-color image by the module assembly, i.e. reducing the power consumption of the display device.

Each of the portions in the present invention is described in a progressive manner, and each portion emphasizes the difference different from the other portion, and the same part or the similar part in each of the portion can be referred to with each other.

According to the disclosure of the embodiments, the present invention can easily be implemented by those skilled in the art. It is understood that modifications to the embodiments can be made by those skilled in the art. The general principle in the present invention can be realized in other embodiments without departing from the spirit and the scope of the present invention. Therefore, the embodiments are not intended to limit the present invention but to provide a wider scope in accordance with the principle and the novelty trait disclosed in the present invention.

What is claimed is:

1. A method for driving a TFT array substrate, wherein the TFT array substrate comprises:

a plurality of gate lines;

a plurality of data lines intersecting with and insulating from the plurality of gate lines; and a plurality of pixels formed by the intersection of the plurality of gate lines and the plurality of data lines, wherein the plurality of pixels are divided into a plurality of pixel units arranged in an array, each of the plurality of pixel units comprises two first main pixels and two second main pixels, a first main pixel is arranged to be adjacent to the second main pixels in a row direction and in a column direction, and a second main pixel is arranged to be adjacent to the first main pixels in a row direction and in a column direction;

wherein the data lines comprise a first set of data lines and a second set of data lines, wherein the first set of data lines comprises a first subset of data lines and a second subset of data lines, and a data line in the first subset of data lines is adjacent to a data line in the second subset of data lines;

wherein, the first set of data lines are formed of odd-numbered data lines, and the second set of data lines are formed of even-numbered data lines; the method comprises:

applying data signals to the odd-numbered data lines and maintaining a reference potential on even-numbered data lines in each frame, wherein the reference potential is applied in at least one cycle of operation, one frame comprises at least one cycle wherein the at least one cycle comprises:

a first time period, during which gate driving signals are sequentially applied to M odd-numbered gate lines, a voltage of the data signal applied to each of the first subset of data lines is equal to a relative potential, and a voltage of a data signal applied to the second subset of data lines is equal to the reference potential; and a second time period, during which the gate driving signals are sequentially applied to N even-numbered gate lines, the voltage of the data signal applied to each of the first subset of odd-numbered data lines is equal to the reference potential, and the voltage of the data signal applied to each of the second subset of data lines is equal to the relative potential;

or, wherein the first set of data lines are formed of even-numbered data lines, and the second set of data lines are formed of odd-numbered data lines; the method comprises:

applying data signals to the even-numbered data lines and maintaining a reference potential on odd-numbered data lines in each frame, wherein one frame comprises at least one cycle, wherein the at least one cycle comprising:

a first time period, during which gate driving signals are sequentially applied to M odd-numbered gate lines, a voltage of the data signal applied to each of the first subset of data lines is equal to a relative potential, and a voltage of a data signal applied to the second subset of data line is equal to the reference potential, and a second time period, during which the gate driving signals are sequentially applied to N even-numbered gate lines, the voltage of the data signal applied to each of the first subset of even-numbered data line is equal to the reference potential, and the voltage of the data signal applied to each of the second subset of data line is equal to the relative potential;

wherein M and N are positive integers, and wherein a sum of rising edges and falling edges of the data signals within one frame is less than a number of rows of the pixels.

2. The method for driving the TFT array substrate of claim 1, wherein the TFT array substrate further comprises:

a first pixel and a second pixel in the first main pixel arranged to be adjacent to each other in the row direction;

comprises a third pixel and a fourth pixel in the second main pixel arranged to be adjacent to each other in the row direction.

3. The method for driving the TFT array substrate of claim 1, wherein pixels in one row are connected to a same gate line.

4. The method for driving the TFT array substrate of claim 1, wherein the sum of rising edges and falling edges in one of the data lines in one frame comprising one cycle is equal to 2; and wherein the method further comprises a driving process including:

during the first time period, sequentially applying gate driving signals to a first odd-numbered gate line to a (Y/2)-th gate line from the odd-numbered gate lines; and during the second time period, sequentially applying the gate driving signals to a first even-numbered gate line to a (Y/2)-th gate line from the even-numbered gate lines, wherein Y represents a total number of rows of the pixels.

5. The method for driving the TFT array substrate of claim 1, wherein one frame comprises two cycles, the sum of rising edges and falling edges of the data signals is equal to 4, and a driving process for one frame comprises a first cycle and a second cycle, wherein:

the first cycle comprises:

a first time period, during which the gate driving signals are sequentially applied to a first to an M-th odd-numbered gate lines; and a second time period, during which the gate driving signals are sequentially applied to a first to an N-th even-numbered gate lines; and the second cycle comprises:

a third time period, during which the gate driving signals are sequentially applied to an(M+1)-th to a(Y/2)-th odd-numbered gate lines; and a fourth time period, during which the gate driving signals are sequentially applied to an(N+1)-th to the (Y/2)-th even-numbered gate lines;

wherein Y represents the number of rows of the pixels and is a positive integer, and M and N are less than or equal to Y/2.

6. The method for driving the TFT array substrate of claim 1, wherein the at least one cycle has a first and a second cycle, the sum of rising edges and falling edges of the data signals is equal to 4, and wherein a driving process for one frame comprises a first cycle and a second cycle, wherein, the first cycle comprises:

a first time period, during which the gate driving signals are sequentially applied to a first to an M-th odd-numbered gate lines; and a second time period, during which the gate driving signals are sequentially applied to a first to an N-th even-numbered gate lines; and the second cycle comprises:

a third time period, during which the gate driving signals are sequentially applied to an (M+1)-th to a (Y/2)-th odd-numbered gate lines; and a fourth time period, during which the gate driving signals are sequentially applied to an(N+1)-th to a (Y/2)-th even-numbered gate lines;

wherein Y represents the number of rows of the pixels and is a positive integer, and both M and N are less than or equal to Y/2.

7. A method for driving a TFT array substrate, wherein the TFT array substrate comprises:

a plurality of gate lines comprising a first set of gate lines and a second set of gate lines, wherein the second set of gate lines comprises a first subset of gate lines and a second subset of gate lines;

a plurality of data lines intersecting with and insulating from the plurality of gate lines, wherein the plurality of data lines are divided into a first set of data lines and a second set of data lines, and a plurality of pixels are formed by the intersection of the plurality of gate lines and the plurality of data lines, wherein the plurality of pixels are divided into a plurality of pixel units arranged in an array, and each of the plurality of pixel units comprises two first main pixels and two second main pixels, in each pixel unit, a first main pixel is arranged to be adjacent to the second main pixels in a row direction and in a column direction, a second main pixel is arranged to be adjacent to the first main pixels in a row direction and in a column direction, each of odd-numbered data lines is connected to an odd-numbered pixel from the plurality of pixels, and each of even-numbered data lines is connected to an even-numbered pixel from the plurality of pixels; the TFT array substrate further comprises a plurality of repeating pixel units arranged in the column direction, each of the plurality of pixel repeating units comprises two adjacent rows of pixels, and in each repeating pixel unit, the first main pixels are connected to a same gate line from the first set of gate lines, the second main pixels in one row of the adjacent rows are connected to the same gate line from the first subset of gate lines, and the second main pixels in the other row of the adjacent rows is connected to a same gate line from the second subset of gate lines;

wherein the method comprises:

gate driving signals are sequentially applied to each of the first set of gate lines in a frame, wherein a voltage of each of the second set of gate lines is equal to a reference potential; a voltage of each of even-numbered data lines is equal to a reference potential in the frame, and data signals are applied to each of odd-numbered data lines, a voltage of the data signals is equal to a relative potential;

or the voltage of each of the odd-numbered data lines is the reference potential, and the data signals are applied to each of the even-numbered data lines, the voltage of the data signal is equal to the relative potential, wherein a sum of rising edges and falling edges of the data signals within one frame is less than a number of rows of the pixels.

8. The method for driving the TFT array substrate of claim 7, wherein the TFT array substrate further comprises:

a first pixel and a second pixel in the first main pixel arranged to be adjacent to each other in the row direction;

a third pixel and a fourth pixel in the second main pixel arranged to be adjacent to each other in the row direction.

9. The method for driving the TFT array substrate of claim 7, wherein in the TFT array substrate, the first set of gate lines are even-numbered gate lines from the plurality of gate lines, and the second set of gate lines are odd-numbered gate lines; or the first set of gate lines are odd-numbered gate lines from the plurality of gate lines, and the second set of gate lines are even-numbered gate lines.

10. A TFT array substrate, comprising:

a plurality of gate lines comprising a first set of gate lines and a second set of gate lines, wherein the second set of gate lines comprises a first subset of gate lines and a second subset of gate lines;

a plurality of data lines intersecting with and insulating from the plurality of gate lines, wherein the plurality of data lines are divided into a first set of data lines and a second set of data lines, and a plurality of pixels formed by the intersection of the plurality of gate lines and the plurality of data lines;

wherein the plurality of pixels are divided into a plurality of pixel units arranged in an array, each of the plurality of pixel units comprises two first main pixels and two second main pixels, in each pixel unit, a first main pixel is arranged to be adjacent to the second main pixels in a row direction and in a column direction, a second main pixel is arranged to be adjacent to the first main pixels in a row direction and in a column direction, each of odd-numbered data lines is connected to an odd-numbered pixel from the plurality of pixels, and each of even-numbered data lines is connected to an even-numbered pixel from the plurality of pixels;

wherein, data signals are applied to odd-numbered data lines from the plurality of data lines, and a voltage of even-numbered data lines from the plurality of data lines is equal to a reference potential; or the data signals are applied to the even-numbered data lines and a voltage of the odd-numbered data lines from the plurality of data lines is equal to the reference potential, wherein a sum of rising edges and falling edges of the data signals in one frame is less than a number of rows of the pixels.

11. The TFT array substrate of claim 10, wherein the first main pixels each comprises a first pixel and a second pixel arranged to be adjacent to each other in the row direction; and the second main pixels each comprises a third pixel and a fourth pixel arranged to be adjacent to each other in the row direction.

12. The TFT array substrate of claim 10, wherein pixels in one row are connected to a same gate line.

13. The TFT array substrate of claim 10, wherein the TFT array substrate comprises a plurality of repeating pixel units arranged in the column direction, wherein each of the plurality of repeating pixel units comprises two adjacent rows of pixels, wherein in each repeating pixel unit, the first main pixels are connected to a same gate line of the first set of gate lines, the second main pixels in one row of the adjacent rows are connected to a same gate line of the first subset of gate lines; and the second main pixels in the other row of the adjacent rows are connected a same gate line of the second subset of gate lines; and wherein the first set of gate lines are even-numbered gate lines, and the second set of gate lines are odd-numbered gate lines; or the first set of gate lines are odd-numbered gate lines, and the second set of gate lines are even-numbered gate lines.

* * * * *